(12) United States Patent
Vassilovski et al.

(10) Patent No.: US 12,150,010 B2
(45) Date of Patent: Nov. 19, 2024

(54) PRIORITY ASSIGNMENT FOR SIDELINK-BASED POSITIONING

(71) Applicant: QUALCOMM Incorporated, San Diego, CA (US)

(72) Inventors: Dan Vassilovski, Del Mar, CA (US); Shuanshuan Wu, San Diego, CA (US); Gabi Sarkis, San Diego, CA (US); Kapil Gulati, Belle Mead, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 17/452,391

(22) Filed: Oct. 26, 2021

(65) Prior Publication Data

US 2023/0127796 A1   Apr. 27, 2023

(51) Int. Cl.
*H04W 4/029* (2018.01)
*H04W 72/56* (2023.01)

(52) U.S. Cl.
CPC .......... *H04W 4/029* (2018.02); *H04W 72/56* (2023.01)

(58) Field of Classification Search
None
See application file for complete search history.

(56) References Cited

U.S. PATENT DOCUMENTS

| 2018/0049219 | A1* | 2/2018 | Gupta | H04W 72/563 |
| 2019/0306923 | A1* | 10/2019 | Xiong | H04J 13/0062 |
| 2021/0045093 | A1* | 2/2021 | Rao | H04W 72/04 |

FOREIGN PATENT DOCUMENTS

| WO | WO-2020064120 A1 * | 4/2020 | G01S 5/00 |
| WO | WO-2022180597 A2 * | 9/2022 | H04L 5/005 |

* cited by examiner

*Primary Examiner* — Angela Nguyen
(74) *Attorney, Agent, or Firm* — QUALCOMM Incorporated

(57) ABSTRACT

This disclosure provides systems, devices, apparatus, and methods, including computer programs encoded on storage media, for prioritization of sidelink-based positioning transmissions. A first UE may receive a request to initiate a sidelink positioning session with a second UE for which a sidelink positioning transmission will overlap in a time domain with communication between the first UE and a base station over a Uu access link. The first UE may transmit the sidelink positioning transmission if a first priority level of the sidelink positioning transmission is higher than a second priority level of the communication over the Uu access link. The first UE may adjust transmission of the sidelink positioning transmission if the first priority level of the sidelink positioning transmission is not higher than the second priority level of the communication over the Uu access link.

31 Claims, 15 Drawing Sheets

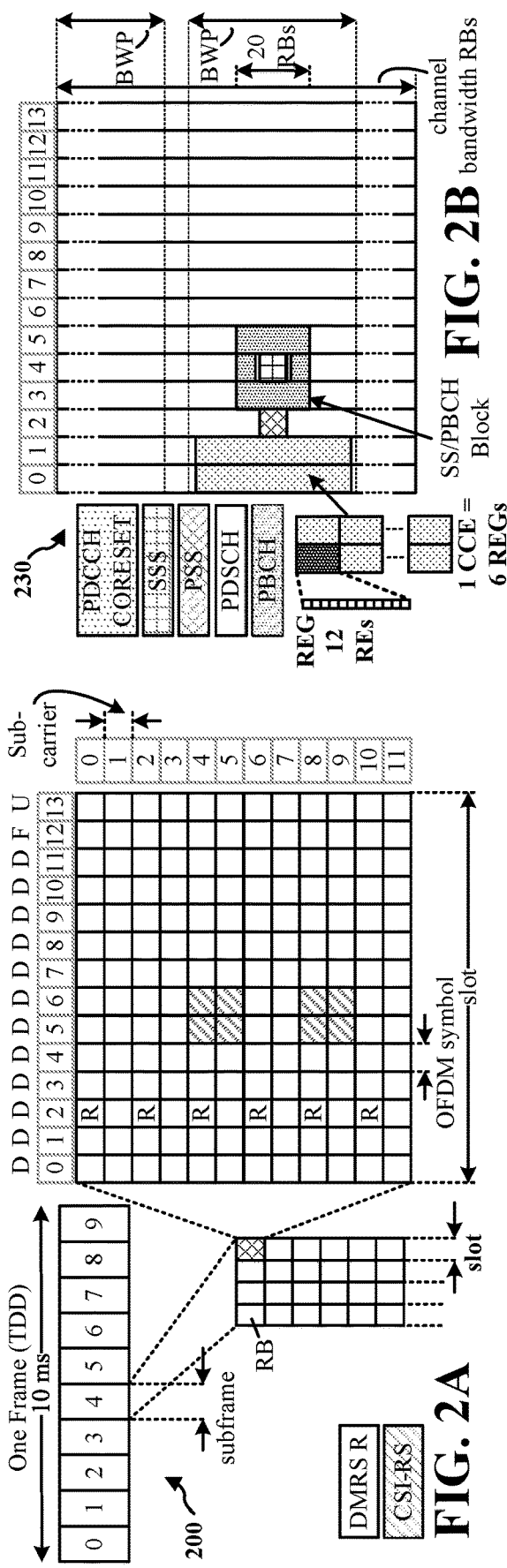
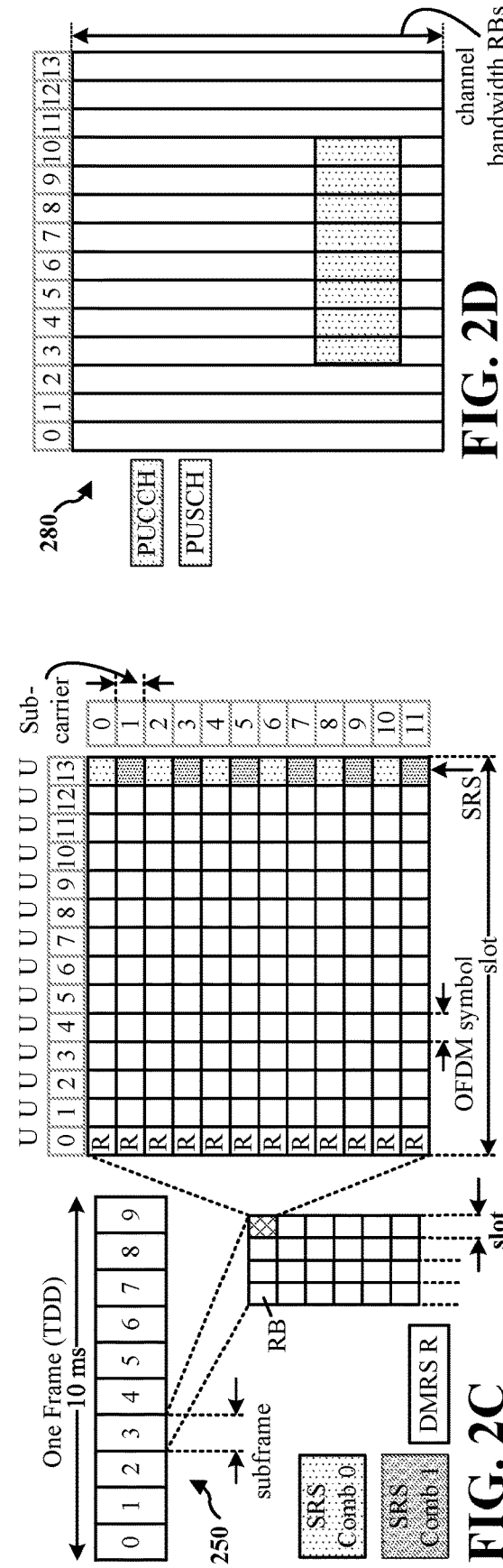
FIG. 2A
FIG. 2B
FIG. 2C
FIG. 2D

PRIORITY ASSIGNMENT FOR SIDELINK-BASED POSITIONING

TECHNICAL FIELD

The present disclosure relates generally to communication systems, and more particularly, to prioritization of sidelink-based positioning transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a request to initiate a sidelink positioning session with a second user equipment (UE) for which a sidelink positioning transmission will overlap in a time domain with communication between the first UE and a base station over a Uu access link; transmit the sidelink positioning transmission if a first priority level of the sidelink positioning transmission is higher than a second priority level of the communication over the Uu access link; and adjust transmission of the sidelink positioning transmission if the first priority level of the sidelink positioning transmission is not higher than the second priority level of the communication over the Uu access link.

In another aspect of the disclosure, a method, a computer-readable medium, and an apparatus are provided. The apparatus may transmit a request to initiate a sidelink positioning session with a first UE, the request indicating a priority level; and receive, from the first UE, a response to the request to initiate the sidelink positioning session with the first UE, the response based on the priority level indicated in the request.

In another aspect of the disclosure, a method, a computer-readable medium, and an apparatus are provided. The apparatus may transmit, to a UE, a first indication of a first priority level for sidelink positioning communication; and transmit or receive non-sidelink communication with the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
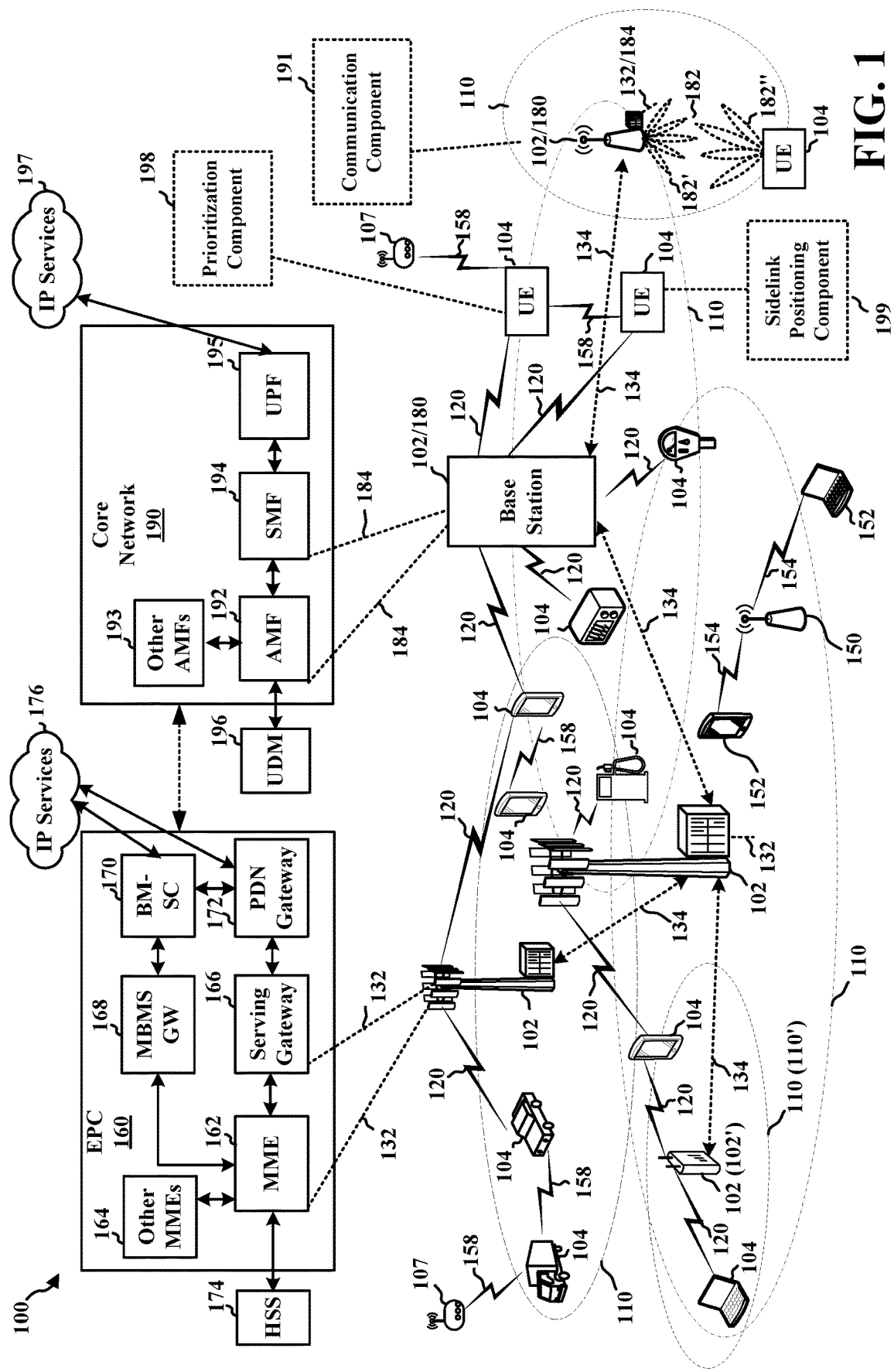
FIG. 1 is a diagram illustrating an example of a wireless communications system and an access network.

Sidelink-based positioning/ranging may enable a first UE (e.g., initiator) to determine a relative distance and/or an absolute position of the first UE. An example of sidelink-based positioning/ranging is described in connection with FIG. 5. Sidelink-based positioning may provide more accurate/reliable positioning determinations than Uu positioning techniques, such as for positioning procedures performed in locations associated with degraded Uu or global navigation satellite systems (GNSS) coverage (e.g., tunnels, urban canyons, etc.). Sidelink-based positioning may also increase a range of the position procedures. In some aspects, positioning communication may overlap in time with other wireless communication, such as transmission or reception with a base station. Aspect presented herein enable a UE to determine a priority level for a positioning session and/or to determine a priority level for the positioning session relative to other communication. In some aspects, the other communication may be NR communication.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 15. Although the following description, including the example slot structure of FIG. 15, may provide examples for sidelink communication in connection with 5G NR, the concepts described herein may be applicable to other similar areas, such as LTE, LTE-A, CDMA, GSM, and other wireless technologies The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, a UE 104 may include a prioritization component 198 configured to receive a request to initiate a sidelink positioning session with a second UE for which a sidelink positioning transmission will overlap in a time domain with communication between the first UE and a base station over a Uu access link; transmit the sidelink positioning transmission if a first priority level of the sidelink positioning transmission is higher than a second priority level of the communication over the Uu access link; and adjust transmission of the sidelink positioning transmission if the first priority level of the sidelink positioning transmission is not higher than the second priority level of the communication over the Uu access link. In some aspects, a UE 104 may include a sidelink positioning component 199 configured to transmit a request to initiate a sidelink positioning session with a first UE, the request indicating a priority level; and receive, from the first UE, a response to the request to initiate the sidelink positioning session with the first UE, the response based on the priority level indicated in the request. As a UE may transmit the request to initiate the sidelink positioning at times and may receive the request to request to initiate sidelink positioning at other times, a single UE may include both a prioritization component 198 and a sidelink positioning component 199, in some aspects. In some aspects, the base station 180 may include a communication component 191 configured to transmit, to a UE, a first indication of a first priority level for sidelink positioning communication; and transmit or receive non-sidelink communication with the UE. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 15:
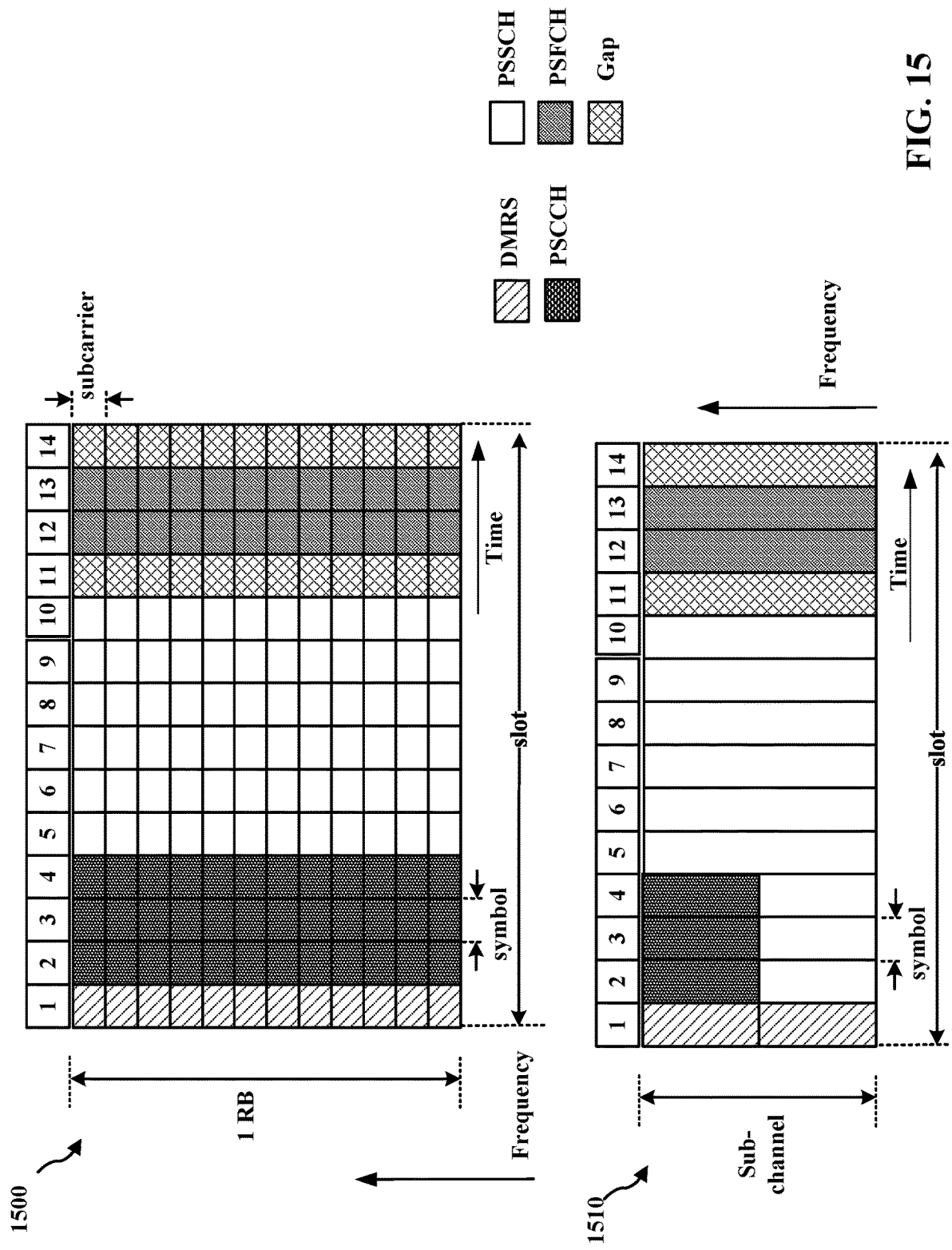
FIG. 15 illustrates example aspects of a sidelink slot structure.

FIG. 15 includes diagrams 1500 and 1510 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 15 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 1500 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 1510 in FIG. 15 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 15, some of the REs may include control information in PSCCH and some REs may include demodulation RS (DMRS). At least one symbol may be used for feedback. FIG. 15 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 15. Multiple slots may be aggregated together in some aspects.

Figure 3:
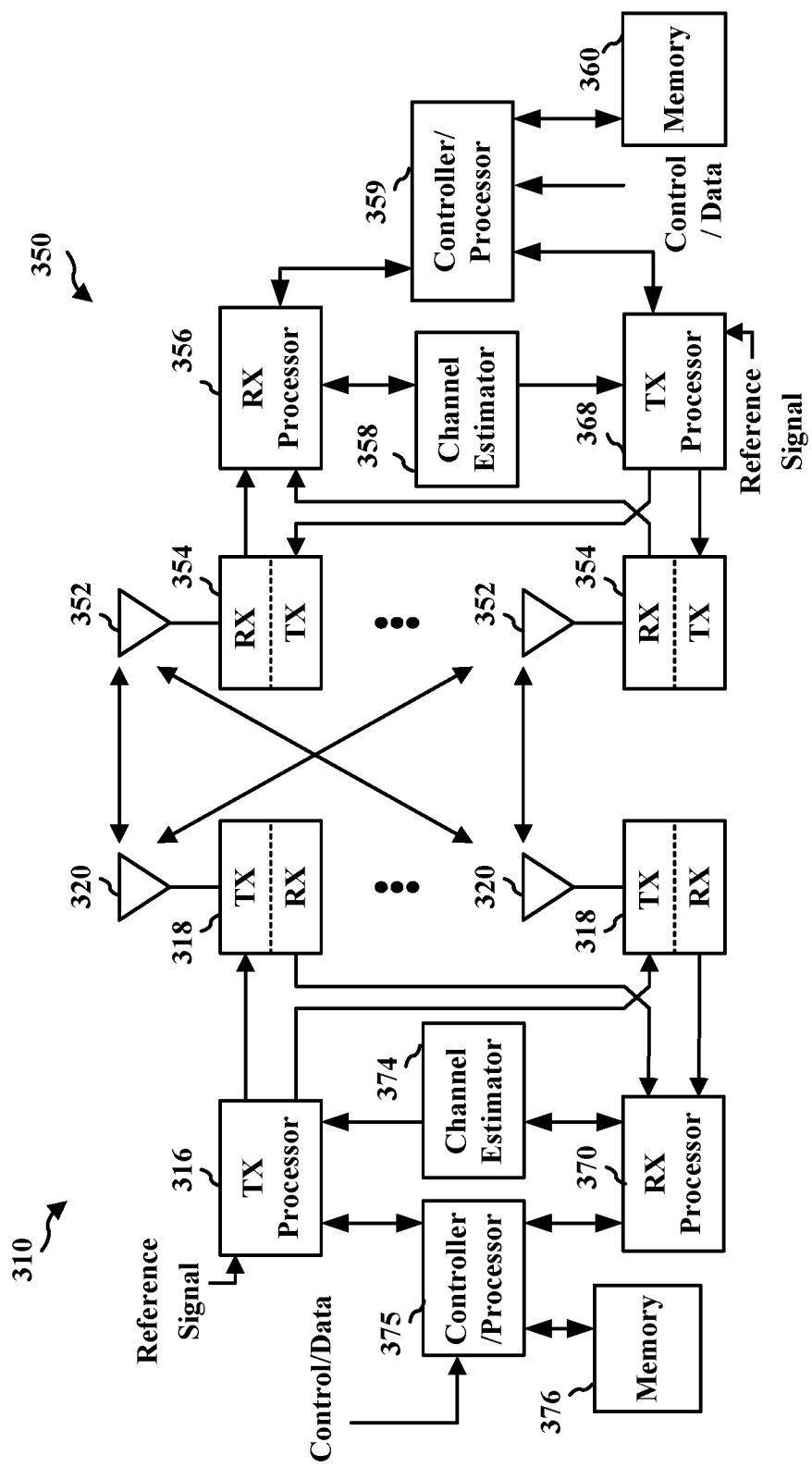
FIG. 3 is a diagram illustrating an example of a first device and a second device involved in wireless communication.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. In some aspects, the device 310 may be a base station, and the device 350 may be a UE in an access network, and the communication exchanged between the devices may be Uu communication over an access link between the base station and the UE. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the prioritization component 198 of FIG. 1.

At least one of the TX processor 316, the RX processor 370, and the controller/processor 375 may be configured to perform aspects in connection with the sidelink positioning component 199 of FIG. 1. In some aspects, a single device may be configured to perform aspects in connection with both the prioritization component 198 and the sidelink positioning component 199. As an example, a UE may transmit the request to initiate the sidelink positioning at times and may receive the request to request to initiate sidelink positioning at other times.

At least one of the TX processor 316, the RX processor 370, and the controller/processor 375 may be configured to perform aspects in connection with the communication component 191 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Sidelink-based positioning/ranging may enable a first UE (e.g., initiator) to determine a relative distance and/or an absolute position of the first UE. An example of sidelink-based positioning/ranging is described in connection with FIG. 5. Sidelink-based positioning may provide more accurate/reliable positioning determinations than Uu positioning techniques, such as for positioning procedures performed in locations associated with degraded Uu or global navigation satellite systems (GNSS) coverage (e.g., tunnels, urban canyons, etc.). Sidelink-based positioning may also increase a range of the position procedures. In some aspects, positioning communication may overlap in time with other wireless communication, such as transmission or reception with a base station. Aspect presented herein enable a UE to determine a priority level for a positioning session and/or to determine a priority level for the positioning session relative to other communication. In some aspects, the other communication may be NR communication.

Figure 4:
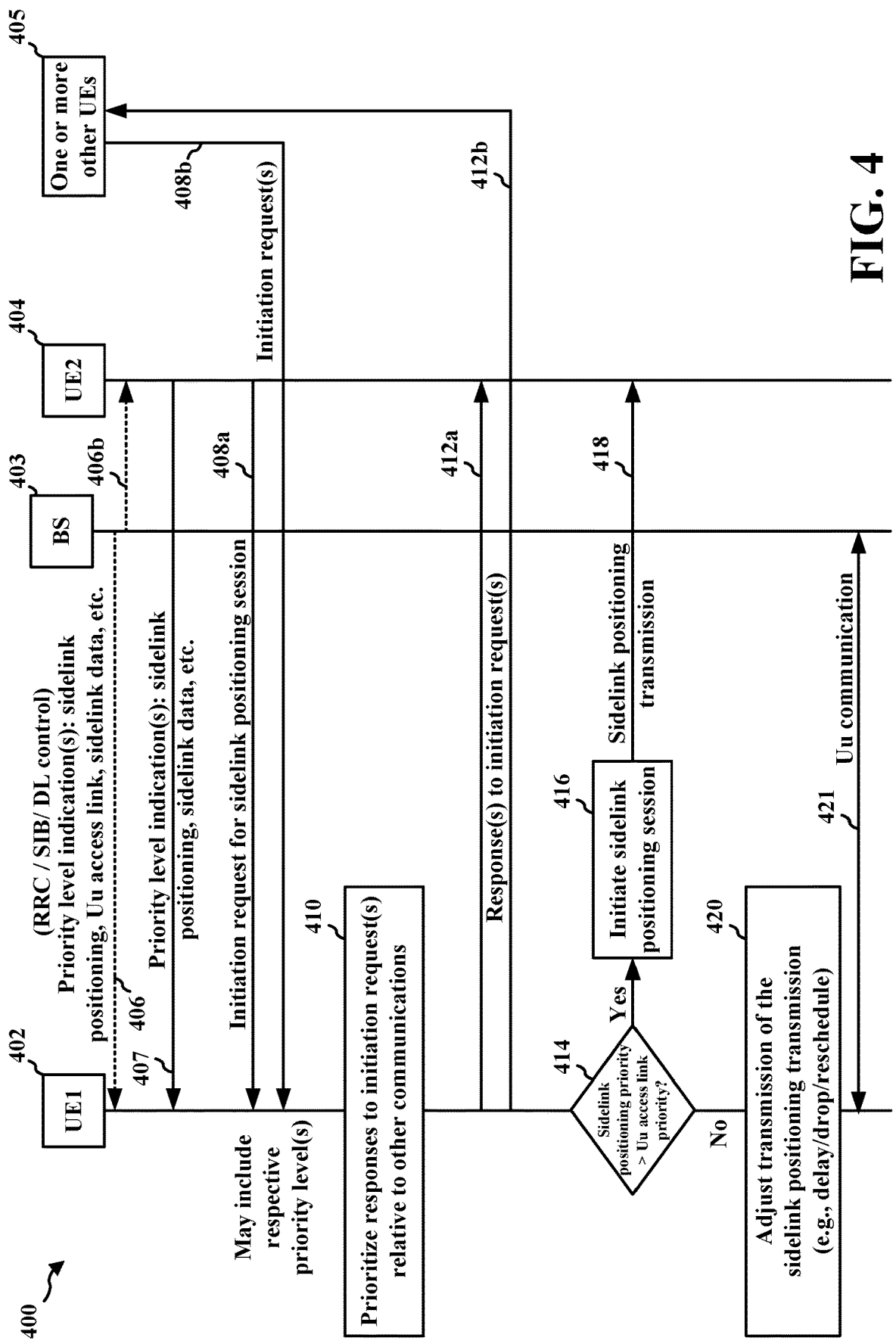
FIG. 4 is a call flow diagram illustrating communications between a first UE, a second UE, one or more other UEs, and a base station.

FIG. 4 is a call flow diagram 400 illustrating communications between a first UE 402, a second UE 404, one or more other UEs 405, and a base station 403. In some aspects, at 406, the first UE 402 may receive priority level indication(s) for sidelink positioning communications, Uu access link communications, other sidelink communications such as sidelink data communications, etc., from the base station 403. In some aspects, the first UE 402 may receive priority level indication(s) for sidelink positioning communications, other sidelink communications such as sidelink data communications, etc. from the second UE 404, at 407. For example, the first UE 402 may receive, at 406, a sidelink positioning priority via a SIB that the base station 403 transmits to UEs of the cell for a cell-wide configuration. As the priority information may be carried in a SIB, the UE 404 may also receive the SIB, as illustrated at 406b in FIG. 4. The sidelink positioning priority, the Uu access link priority, and/or the sidelink data priority may also be received, at 406, via RRC signaling from the base station 403. The priority level associated with the sidelink positioning communications and may be relative to Uu access link communications with the base station 403 that overlap in time with the side link positioning communications. In further examples, the first UE 402 may receive, at 407, the sidelink positioning priority from the second UE 404 via sidelink.

The priority level indication(s) may be configured or pre-configured to the first UE 402. "Configured" may refer to the network/base station 403 indicating the priority of the sidelink positioning to the first UE 402. "Pre-configured" may refer to priority protocol-related parameters that are stored at the first UE 402 for the first UE 402 to prioritize the sidelink positioning transmissions based on execution of the priority protocol-related parameters. At 408a, the first UE 402 may receive an initiation request from the second UE 404 for a sidelink positioning session with the first UE 402. The initiation request may include/indicate a priority level of sidelink positioning communications. In further examples, the first UE 402 may also receive, at 408b, initiation request(s) from one or more other UEs 405. The initiation request(s) received, at 408b, from the one or more other UEs 405 may likewise include/indicate respective priority level(s) associated with the respective initiation request(s).

At 410, the first UE 402 may prioritize responses to the initiation request(s) received, at 408a-408b, where the prioritization may be relative to other communications (e.g., Uu communications, NR communications, other side link communications, other sidelink positioning responses, etc.). At 412a, the first UE may transmit, to the second UE 404, a response to the initiation request received, at 408a, from the second UE 404. At 412b, the first UE may also transmit, to the one or more other UEs 405, response(s) to the initiation request(s) received, at 408b, from the one or more other UEs 405.

At 414, the first UE 402 may determine whether the sidelink positioning priority is greater than the Uu access link priority. If the sidelink positioning priority is greater than the Uu access link priority, the first UE 402 may initiate, at 416, a sidelink positioning session with the second UE 402 based on the initiation request received, at 408a, from the second UE 404 and the associated response transmitted, at 412a, to the second UE 404. At 418, the first UE 402 may transmit a sidelink positioning transmission to the second UE 404 based on the initiation, at 416, of the sidelink positioning session with the second UE 404. If the sidelink positioning priority is determined, at 414, to not be greater than the Uu access link priority, the first UE 402 may adjust, at 420, transmission of the sidelink positioning transmission to the second UE 404. For example, the first UE 402 may drop, delay, and/or reschedule the sidelink positioning transmission to adjust the transmission, at 420. If the Uu communication 421 has a higher priority level than the sidelink positioning transmission, the UE 402 may transmit, or receive, the Uu communication 421.

Figure 5:
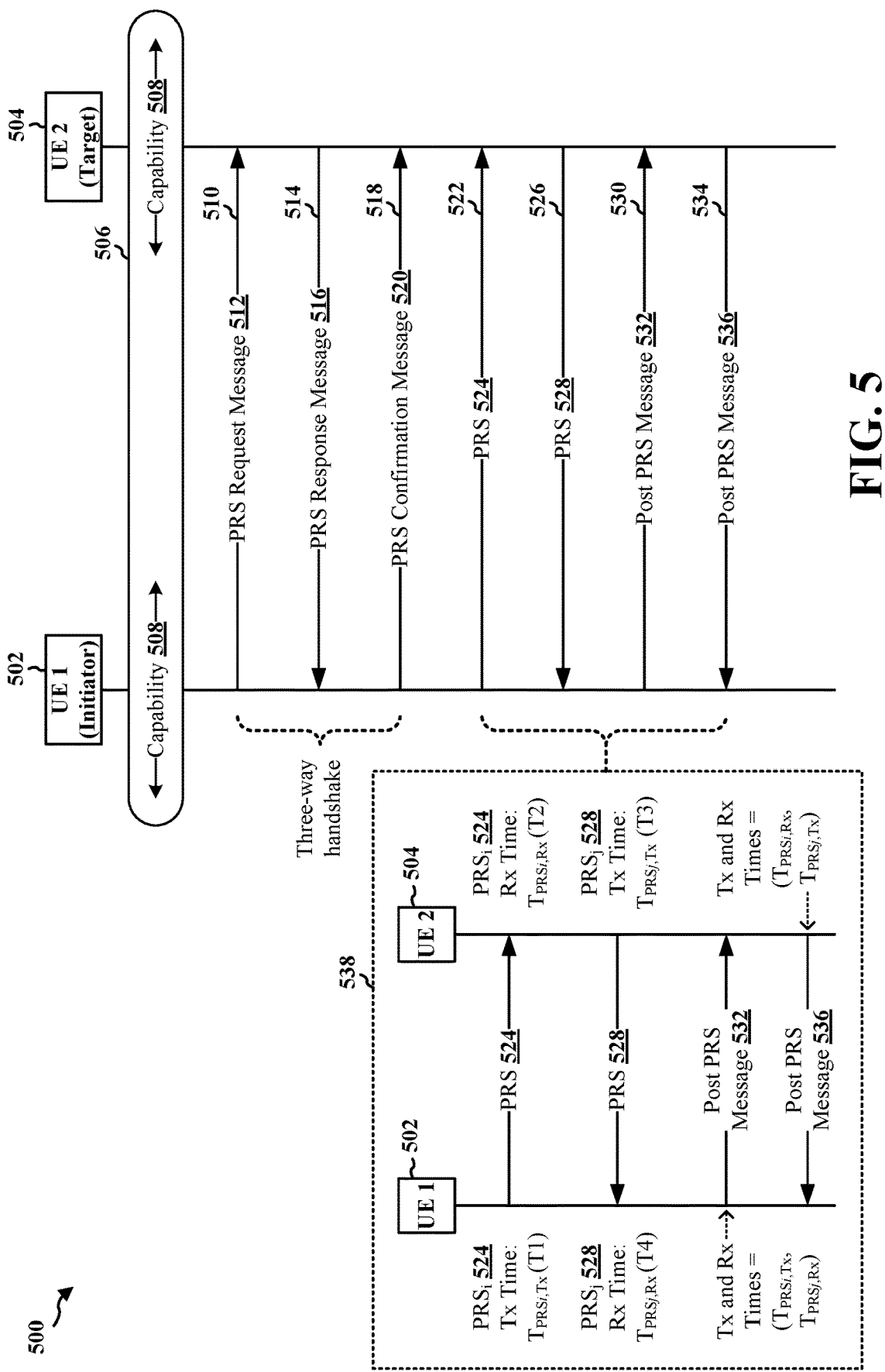
FIG. 5 is a communication flow diagram illustrating an example of a sidelink-based positioning/ranging session between two UEs.

FIG. 5 is a communication flow diagram 500 illustrating an example of a sidelink-based positioning/ranging session between two UEs. Sidelink-based positioning may be performed based on one or more sidelink control protocols. In some cases, sidelink positioning may also be performed via a Uu link. However, as sidelink may be associated with UE-to-UE forms of communication, other techniques may be implemented for sidelink-based positioning. Sidelink-based positioning/ranging may enable a first UE 502 (e.g., initiator) to determine a relative distance and/or an absolute position of the first UE 502. Sidelink-based positioning may provide more accurate/reliable positioning determinations than Uu positioning techniques, such as for positioning procedures performed in locations associated with degraded Uu or global navigation satellite systems (GNSS) coverage (e.g., tunnels, urban canyons, etc.). Sidelink-based positioning may also increase a range of the position procedures.

In aspects, sidelink positioning may be based on a range between two or more UEs, such as the first UE 502 and a second UE 504. Based on additional information or successive measurements by the first UE 502, the range may be converted to a position. Sidelink-based ranging may utilize a three-way handshake for session establishment. Three-way handshaking may be an example implementation for session establishment. Other implementations may include two-way handshakes, one-way handshakes, etc.

Inter-UE messaging may be used to initiate and execute a positioning session and may include, or be subject to, prioritization. The first UE 502 that initiates the positioning session with the second UE 504 (e.g., target) may indicate session parameters to the second UE 504. The first UE 502 and the second UE 504 may exchange position reference signals (PRSs) as well as measurements that are based on transmission/reception of the PRSs. The PRSs may be wideband signals communicated between the first UE 502 and the second UE 504. The participating UEs 502-504 of the positioning session may perform temporal measurements based on the transmission and reception of the PRSs for determining a round trip time (RTT) of the signals, which may be converted to a distance between the UEs 502-504 based on a known speed of transmission of the PRSs.

The first UE 502 and the second UE 504 may be capable of participating in Uu communications, sidelink communications, communications for multiple Uu/sidelink sessions, and/or the sessions that occur over different technologies (e.g., NR or LTE). Thus, the UE 502 and the second UE 504 that participate in the sidelink ranging/positioning session may also participate in other sidelink transmissions and/or other Uu transmissions. Based on the capability of the first UE502 and the second UE 504, the participation may be simultaneous or the UEs 502-504 may determine which procedure is more/less important for participation in view of available resources. For a UE that has hardware and/or software resource limitations associated with a number of simultaneous sessions that may be supported by the UE, establishing a priority for the sidelink ranging/positioning transmissions may improve the performance of the UE. The UE may apply the prioritization for sidelink positioning communication, for example, in addition to prioritization between LTE and NR transmissions, and/or even among the NR transmissions. For example, the priority of sidelink positioning transmissions may be determined by the first UE 502, so that if the first UE 502 is engaged in other transmissions, such as for maneuver sharing, etc., the first UE 502 may determine which transmission is associated with a higher priority for signaling purposes.

The first UE 502 that initiates a session may determine the priority of the session with respect to other transmissions of the UE 502. For example, a signaling mechanism may be used for the first UE 502 to initiate a session for determining the priority of the session and the priority of a session transmission relative to other transmissions. The first UE 502 may also determine the priority of transmission responses for responding to a sidelink positioning session. The priority may be configured or preconfigured. That is, the second UE 504 may either receive an explicit instruction from the network regarding the priority of the transmissions or the priority information may be preconfigured within the second UE 504. Information elements (IEs) used to configure the priority parameters may be incorporated in regular messaging procedures or in messages associated with sidelink positioning. Thus, the IEs may be used to determine the priority of sidelink positioning sessions/transmissions and may be decodable in association with a plurality of applications, such as cellular vehicle-to-everything (C-V2X) applications.

In the diagram 500, sidelink ranging/positioning between the first UE 502 (e.g., initiator) and the second UE 504 (e.g., target) may be determined based at least in part on calculating an inter-UE RTT between first PRSs (e.g., wideband PRSs, sidelink PRSs, etc.) transmitted from the first UE 502 to the second UE 504 and second PRSs transmitted from the second UE 504 to the first UE 502. For example, based on the transmission and reception times of the PRSs between the first UE 502 and the second UE 504, the first UE 502 and/or the second UE 504 may be able to determine the RTT between the transmitted PRSs and the received PRSs. Then, based on the RTT, the first UE 502 and/or the second UE 504 may determine a distance between the first UE 502 and the second UE 504.

In one example, as shown at 506, the first UE 502 and/or the second UE 504 may exchange a capability message 508 with each other, where the capability message 508 from the first UE 502 and/or the second UE 504 may include information related to each UE's capability to perform sidelink ranging/positioning. Based at least in part on the exchanged capability messages 508, the first UE 502 may determine whether the second UE 504 is a candidate for performing the sidelink ranging/positioning.

After the capability message 508 is exchanged, at 506, the first UE 502 may initiate a sidelink ranging/positioning session with the second UE 504 by establishing a three-way handshake with the second UE 504. While three-way handshaking is illustrated in the diagram 500 for exemplary purposes, other techniques may also be used for session establishment. At 510, the first UE 502 may transmit a PRS request message 512 (e.g., PRSrequest) to the second UE 504 for requesting the second UE 504 to transmit one or more PRSs to the first UE 502. At 514, in response to the PRS request message 512, the second UE 504 may transmit a PRS response message 516 to the first UE 502. The PRS response message 516 may indicate whether the second UE 504 is able to grant the PRS request of the first UE 502 (e.g., the request to exchange PRS). At 518, in response to the PRS response message 516, the first UE 502 may transmit a PRS confirmation message 520 to the second UE 504. The PRS confirmation message 520 may confirm the PRS transmissions between the first UE 502 and the second UE 504. In other words, the three-way handshake initiated by the first UE 502 may include transmission of the PRS request message 512, reception of the PRS response message 516, and transmission of the PRS confirmation message 520 at the first UE 502.

At 522, after the three-way handshake or other session establishment technique is performed (e.g., two-way handshake, one-way handshake, etc.), the first UE 502 may transmit one or more PRSs 524 to the second UE 504. That is, different types of inter-UE messaging may be performed to initiate a positioning session between the first UE 502 and the second UE 504. At s in response to the one or more PRSs 524, the second UE 504 may transmit one or more PRSs 528 to the first UE 502. In some example, the PRSs 514 and 528 from the first UE 502 and the second UE 504 may be transmitted in a reverse order from the diagram 500.

At 530, after receiving the one or more PRSs 526 from the second UE 504, the first UE 502 may measure the received one or more PRSs 526, such as the time in which the one or more PRSs 526 are received, and the first UE 502 may transmit information related to the measurement to the second UE 504 via a post PRS message 532. Similarly, at 534, the second UE 504 may measure the one or more PRSs 528, and the second UE 504 may transmit information related to the measurement to the first UE 502 via a post PRS message 536. In some example, the post PRS messages 532 and 536 from the first UE 502 and the second UE 504 may be transmitted in a reverse order from the diagram 500. Based on a local measurement for the transmitted PRS and the received PRS (e.g., PRSs 524 and 528) and based on the measurement received from the other UE in the post PRS message (e.g., messages 532 and 536), the first UE 502 and/or the second UE 504 may be able to determine an RTT for the transmitted and the received PRSs.

In one example, as shown at 538, the first UE 502 and/or the second UE 504 may include two timestamps for the Tx time and the Rx time of the PRSs transmitted and received in respective post PRS messages. Then, the first UE 502 and/or the second UE 504 may determine the RTT for the PRSs transmitted and received based on the two timestamps received from the other UE. For example, the first UE 502 may include a transmission time for the PRS 524 (e.g., $T_{PRS_i,Tx}$ T1) and a reception time for the PRS 528 (e.g., $T_{PRS_j,Rx}$, T4) in the post PRS message 532, and the second UE 504 may include a reception time for the PRS 524 (e.g., $T_{PRS_i,Rx}$ T2) and a transmission time for the PRS 528 (e.g., $T_{PRS_j,Tx}$ T3) in the post PRS message 536. S In other words, each UE may transmit a PRS Tx time and a PRS Rx time for the PRS received from the peer UE in a post PRS message. Then, the RTT may be calculated by subtracting the respective Rx/Tx times of the PRSs. For example, the RTT may be calculated based on the following algorithms:

$$RTT = (T_{PRS_i,Rx} - T_{PRS_i,Tx}) + (T_{PRS_j,Rx} - T_{PRS_j,Tx}),$$

$$RTT = \left(\begin{array}{c}PRS_i \text{ one way} \\ \text{time of flight}\end{array}\right) + \left(\begin{array}{c}PRS_j \text{ one way} \\ \text{time of flight}\end{array}\right).$$

A distance between the first UE 502 and the second UE 504 may be computed based on the calculated RTT. The sidelink-based ranging/positioning described herein may apply to a set of vehicle UEs (e.g., for calculating/estimating a distance between two vehicles), to a vehicle UE and a pedestrian UE (e.g., for calculating/estimating a distance between a vehicle and a pedestrian), and/or to two mobile UEs in general sidelink use cases (e.g., for calculating/estimating a distance between two mobile phone users), etc.

Figure 6:
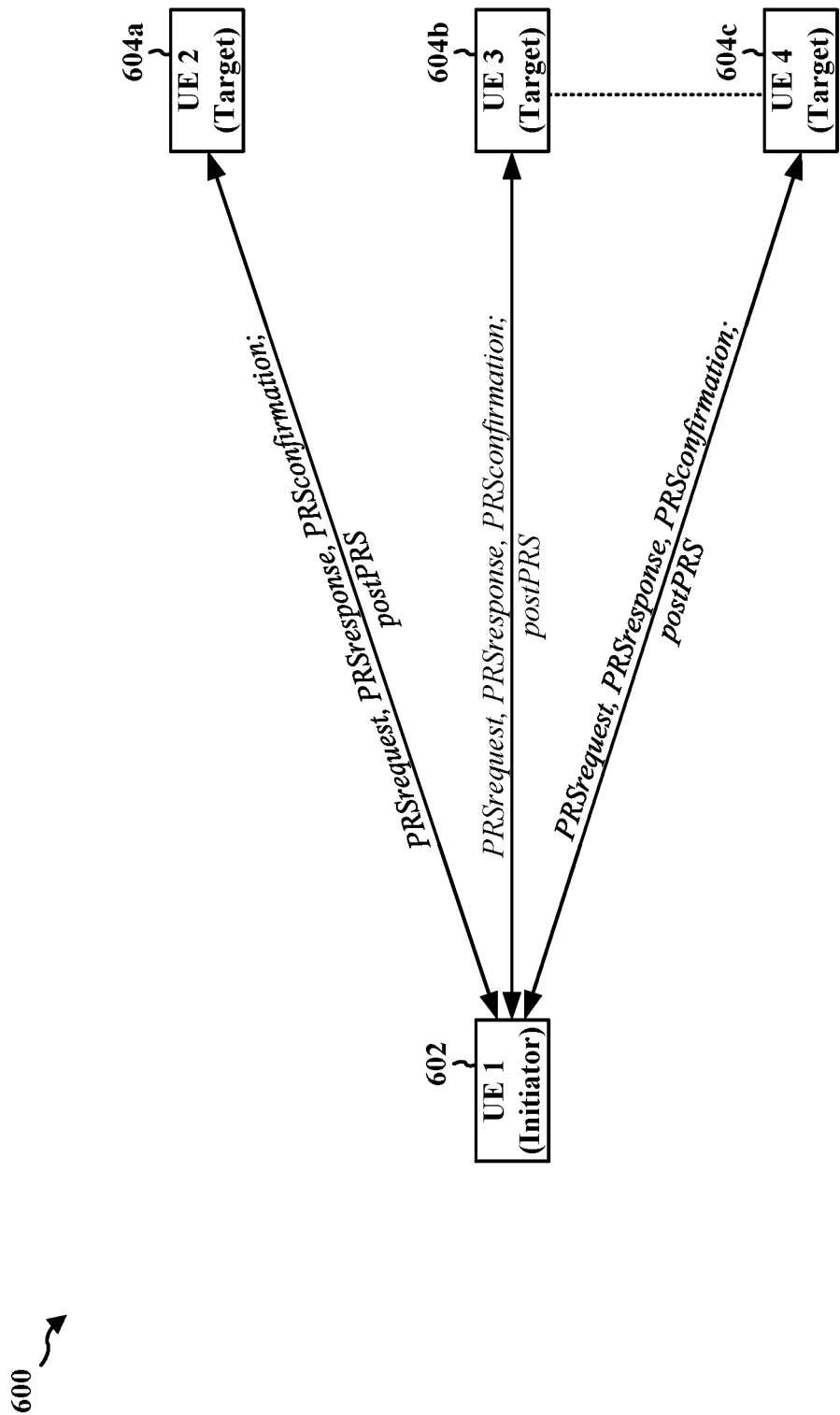
FIG. 6 is a diagram that illustrates sidelink ranging/positioning sessions associated with N participating UEs.

FIG. 6 is a diagram 600 that illustrates sidelink ranging/positioning sessions associated with N participating UEs. For example, a first UE 602 (e.g., initiator) may initiate a positioning session with a target, such as a second UE 604*a*, a third UE 604*b*, and/or a fourth UE 604*c*. In some examples, targets such as the third UE 604*b* and the fourth UE 604*c* may also be in communication with each other.

UE participation, PRS transmission, and subsequent RTT calculation may be coordinated via an initial messaging handshake (e.g., PRSrequest, PRSresponse, and PRSconfirmation). That is, the first UE 602/initiator may broadcast a PRSrequest for targets, such as the second UE 604*a*, the third UE 604*b*, and the fourth UE 604*c*. Based on the broadcast, the first UE 602 may receive a PRSresponse to the PRSrequest. The first UE 602 may then transmit a PRSconfirmation to indicate to the second UE 604*a*, the third UE 604*b*, and/or the fourth UE 604*c* that the PRSresponse was received by the first UE 602. Message exchanges between the initiator and the target(s) that follow the PRS communications (e.g., postPRS) may be performed to share, with peer UEs, measurements associated with the PRSs.

Aspect presented herein provide mechanisms for a UE to prioritize sidelink positioning signals relative to each other and/or relative to other types of communication, such as NR communication, LTE communication, or other Uu communication. The UE may prioritize the sidelink positioning transmissions based on information received via IEs and/or SIBs. That is, sidelink positioning may be prioritized relative to Uu transmissions or other NR and LTE transmissions. An RRC IE may be generated for prioritizing sidelink positioning transmissions relative to Uu transmissions. The RRC IE may indicate a priority of the sidelink positioning transmission and how the transmission is to be prioritized relative to Uu transmissions, etc.

In examples, the RRC IE may include indicators, such as a priority level for sidelink communication, which may be used for prioritizing sidelink data. In some aspects, the priority level for the sidelink communication may be referred to as "sl-PriorityThres" or by another name and may have a priority level indicated as one among multiple possible priority levels. As one example, an RRC IE may indicate sl-PriorityThres::=INTEGER (1..8), although an integer value between 1 and 8 is merely one example to illustrate the concept. The value may be indicated based on any set of integer values. Additionally, or alternatively, the UE may receive an indication of a priority level for sidelink positioning communication. In some aspects, the priority level for the sidelink positioning communication may be referred to as "sl-PriorityThres-SLP" and may have a priority level indicated as one among multiple possible priority levels. As one example, an RRC IE may indicate sl-PriorityThres-SLP::=INTEGER (1..8), although an integer value between 1 and 8 is merely one example to illustrate the concept. The value may be indicated based on any set of integer values. In some aspects, the indicated priority level for the sidelink positioning communication may be dedicated to prioritization of sidelink positioning transmissions, e.g., rather than non-positioning sidelink communication. While the indicators described herein are discussed using certain naming conventions, such naming conventions are used herein for exemplary purposes to indicate the content of the messages and may be named/labeled differently in other example implementations. Integer values 1-8 in the above-described examples may correspond to a priority value of the associated transmissions, where a value of 1 may correspond to a lowest priority and a value of 8 may correspond to a highest priority. By utilizing an IE that is dedicated to sidelink positioning, prioritization of sidelink positioning signals may be performed independently of sidelink data and associated Uu transmissions.

For prioritizing sidelink positioning transmissions relative to other Uu communication, such as NR and LTE transmissions, the RRC IE may include an indicator that indicates a priority level for the sidelink positioning communication relative to a particular type of Uu communication, e.g., Uu communication of a particular radio access technology (RAT). As an example, the UE may receive an indication of a priority level of sidelink positioning communication relative to NR communication. In some aspects, an information element for indicating such a priority level may be referred to as "sl-SLP-PriorityNR" and may have an integer value similar to the other examples of priority levels for the sidelink positioning communication, e.g., an INTEGER (1..8). The RRC IE may allow the first UE 602 that initiates the sidelink positioning session to determine, identify, or otherwise assign a priority value to a sidelink positioning transmission relative to an NR transmission, as an example. In examples, the priority value may be inherited from, or derived from, an application-layer service. Sidelink positioning may be regarded as a service in some instances, which may have a priority assigned to the service. The priority value may also be based on a transmitter type (e.g., roadside unit (RSU), public safety onboard unit (OBU), private OBU, etc.). For example, a police car may be assigned a higher priority value than a taxi. Priority values may also be configured by the network on an ad-hoc basis. In further examples, infrastructure such as an RSU might have a higher priority than a passenger vehicle. An initiator UE, such as the first UE 602, may assign a priority value to all sidelink positioning transmissions (e.g., prePRS, post-PRS, etc.) to be used during the course of the priority session. If a resource conflict occurs, sidelink positioning transmissions may be prioritized relative to other Uu communication, such as NR and/or LTE transmissions based on the indicated sl-SLP-PriorityNR.

The second UE 604a, the third UE 604b, and/or the fourth UE 604c that receive the sidelink positioning request transmitted by the first UE 602 may be assigned a same priority as received in a PRS message, such as a message before the PRS that may be referred to as a prePRS, for responses to the positioning session requests. That is, the priority associated with a transmitted message (e.g., the request for a sidelink positioning session) may be inherited by the responder (e.g., the UE that will transmit the sidelink positioning transmission in response to the request) and used to prioritize sidelink positioning transmissions for the positioning session relative to other communication. For example, the first UE 602 may receive separate sidelink positioning requests associated with different priorities, where the responses of the first UE 602 may inherit the respective priorities of the received positioning requests. In some examples, sidelink positioning requests received from an RSU may have a higher priority than sidelink positioning requests received from another UE. In further examples, sidelink positioning requests received from public safety vehicles may have a higher priority than sidelink positioning requests received from non-public safety vehicle (e.g., rideshare vehicles).

Figure 7:
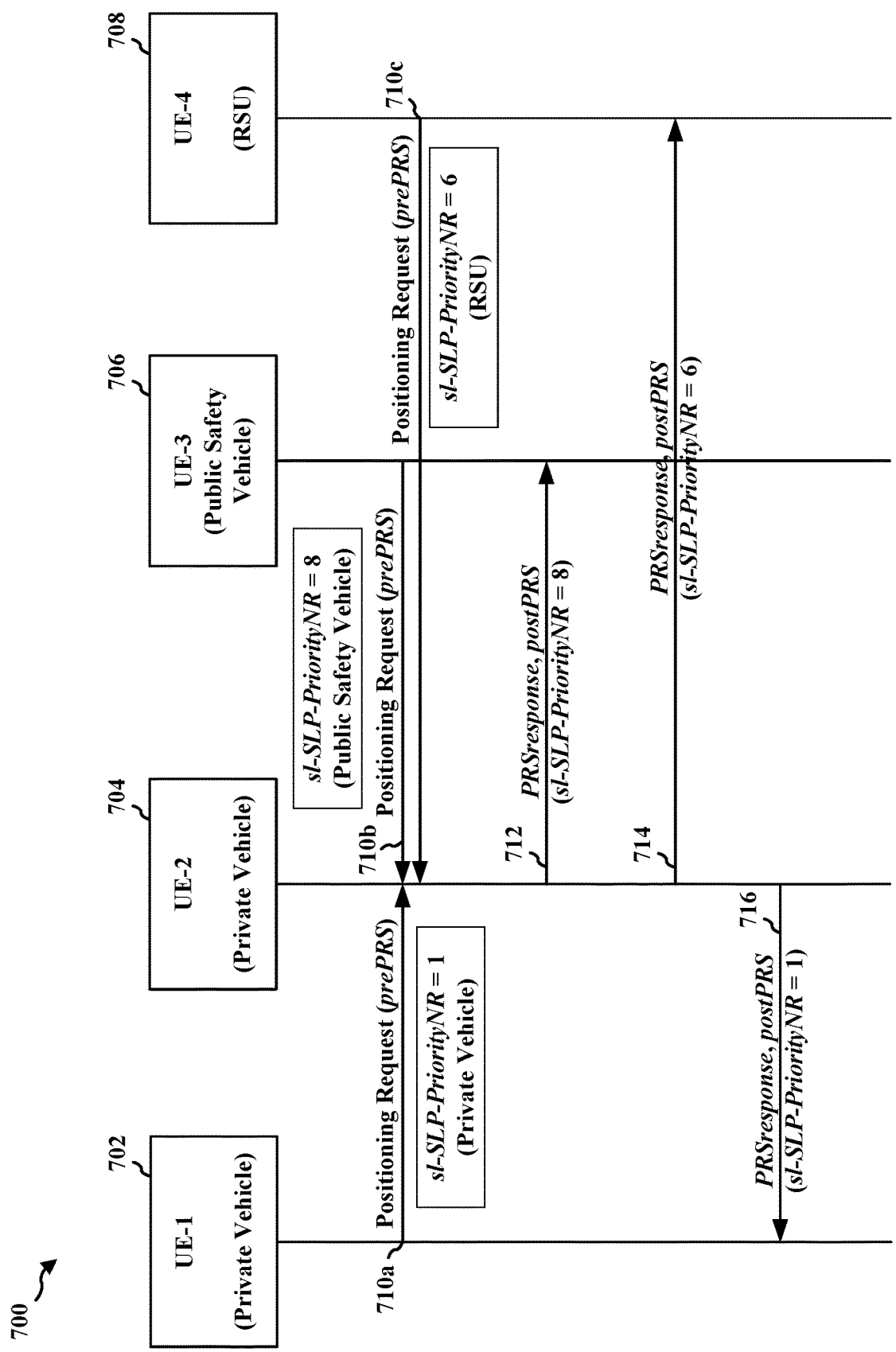
FIG. 7 is a call flow diagram of a UE that prioritizes sidelink positioning transmissions to a plurality of other UEs.

FIG. 7 is a call flow diagram 700 of a UE that prioritizes sidelink positioning transmissions to a plurality of other UEs. That is, the UE (e.g., second UE 704) may be configured to prioritize responses to multiple sidelink positioning requests received, at 710a-710c, from a first UE 702, a third UE 706 and a fourth UE 708. The positioning requests (e.g., prePRS) may be received by the second UE 704 simultaneously or in succession, and may be prioritized relative to each other and/or relative to Uu, NR, and/or LTE transmissions.

At 710a-710c, the second UE 704 may receive the multiple requests from the other UEs (e.g., the first UE 702, the third UE 706, and the fourth UE 708) for initiating sidelink positioning sessions. The second UE 704, which may correspond to a private vehicle, may prioritize transmissions (e.g., PRSresponse, postPRS, etc.) based on a priority value associated with the positioning requests. For example, at 710a, the first UE 702 may correspond to a private vehicle that transmits a positioning request including sl-SLP-PriorityNR=1, where 1 may correspond to a lowest priority level. At 710b, the third UE 706, which may be a public safety vehicle, may transmit a positioning request including sl-SLP-PriorityNR=8, where 8 may correspond to a highest priority level. At 710c, the fourth UE 708, which may be an RSU, may transmit a positioning request including sl-SLP-PriorityNR=6 having a priority level that is in between the public safety vehicle and the private vehicle.

The second UE 704 may prioritize transmissions in response to each positioning session request based on the priority value indicated via sl-SLP-PriorityNR in each of the sidelink positioning requests (e.g., prePRS) received, at 710a-710c, from the other UEs. The priority value of the transmissions/responses may be the same as/inherited from the priority value indicated via the positioning requests and compared to a priority value of the other positioning requests and/or a priority value of other types of transmissions (e.g., Uu, NR, LTE, etc.). In the diagram 700, transmissions to the third UE 706 (e.g., public safety vehicle) may be associated with a highest priority value of 8 and may be transmitted first, transmissions to the fourth UE 708 (e.g., RSU) may be associated with a lower priority value of 6 and may be transmitted second, and transmissions to the first UE 702 (e.g., private vehicle) may be associated with a lowest priority value of 1 and may be transmitted last.

At 712, the second UE 704 may transmit a communication (e.g., PRSresponse, postPRS, etc.) to the third UE 706 based on the third UE 706 being associated with the highest priority. At 714, the second UE 704 may transmit a subsequent communication (e.g., PRSresponse, postPRS, etc.) to the fourth UE 708 based on the fourth UE 708 being associated with a next highest priority. At 716, the second UE 704 may transmit a further subsequent communication (e.g., PRSresponse, postPRS, etc.) to the first UE 702 based on the first UE 702 being associated with a lowest priority. The second UE 704 may also prioritize sidelink positioning transmissions relative to other Uu, NR, and LTE transmissions based on the priority value indicated via sl-PriorityThres-SLP.

In some examples, a base station may transmit a cell-wide configuration of a priority level for sidelink positioning transmissions in a SIB IE. As an example, the UE may receive the priority level for the sidelink positioning transmissions in a SIB12 IE or in another SIB From the base station. As an example, the IE may be included in a common sidelink configuration for the cell (e.g., which may be referred to as "SL-ConfigCommon" or "SL-ConfigCommon NR." In some aspects, the priority level for the sidelink positioning may be indicated in an information element of the SIB, such as "SL-UE-SelectedConfig". In other aspects, the priority level may be provisioned directly in the SIB, such as in the SIB 12. The network may provide the configuration to the second UE 704 through a SIB that may also be received by a plurality of other UEs of the cell, such as the first UE 702, the third UE 706, and the fourth UE 708. Thus, information included in the SIB may be applicable to all of the plurality of UEs of the cell, including the second UE 704. The indicator sl-SLP-PriorityNR may be included in the SIB12 IE for configuring the plurality of UEs of the cell. In further examples, a sidelink positioning anchor accuracy threshold may be added to the SIB12 IE via SL-UE-SelectedConfig-r16. Other SIB12 IEs may also be used for configuring the plurality of UEs of the cell. Alternatively, the network may perform a direct configuration of a particular UE of the cell, such as the second UE 704, as opposed to a cell-wide configuration, based on one or more direct communications with the particular UE (e.g., second UE 704).

IEs may be incorporated in the SIB for performing the cell-wide configuration of the plurality of UEs of the cell. For example, cell-wide configurations via SIB12 may be based on sl-SLP-PriorityNR, which may be incorporated in the SIB12 via sl-UE-SelectedConfig-r16. Thus, some IEs may be enhanced IEs that include supplemental for prioritization. The enhanced IEs including the prioritization information may then be included in the SIB for performing the cell-wide configuration of the plurality of UEs of the cell.

In further aspects, the prioritization information may be included directly within the SIB. That is, the prioritization information may be independent of any IEs of the SIB, rather than including the prioritization information within a specific IE of the SIB (e.g., sl-UE-SelectedConfig-r16). Accordingly, the cell-wide configuration may be performed via sl-SLP-PriorityNR, which may be included directly within the SIB 12.

The priority of the sidelink positioning transmissions relative to other sidelink transmissions and/or Uu, NR, LTE transmissions, etc., may be either configured or pre-configured. Given that sidelink communications may be performed when there is no Uu coverage, pre-configuration of the second UE 704 may be performed for the second UE 704 to determine the priority of the sidelink positioning. The second UE 704 may access the pre-configured information for performing priority determinations.

In some aspects, the UE may receive an RRC configuration of a priority level for the sidelink positioning communication. The RRC configuration may be dedicated for a particular UE, in some aspects. As an example, an RRC IE, such as SL-ConfigDedicatedNR may include an indication of a priority level for sidelink positioning communication. In some aspects, the indication for the priority level may be relative to a particular type of other communication, such as NR communication. In an example, NR sidelink information may be associated with a pre-configuration (e.g., SL-Pre-configurationNR). Priority information such as sl-SLP-PriorityNR may be incorporated directly into the configuration or incorporated into the configuration via an IE (e.g., SL-UE-SelectedConfig). Other IEs may also be used in association with the configuration. For example, NR sidelink positioning priority in comparison to Uu priority may be based on sl-PriorityThres-SLP being associated with a SL-ResourcePool IE.

Figure 8:
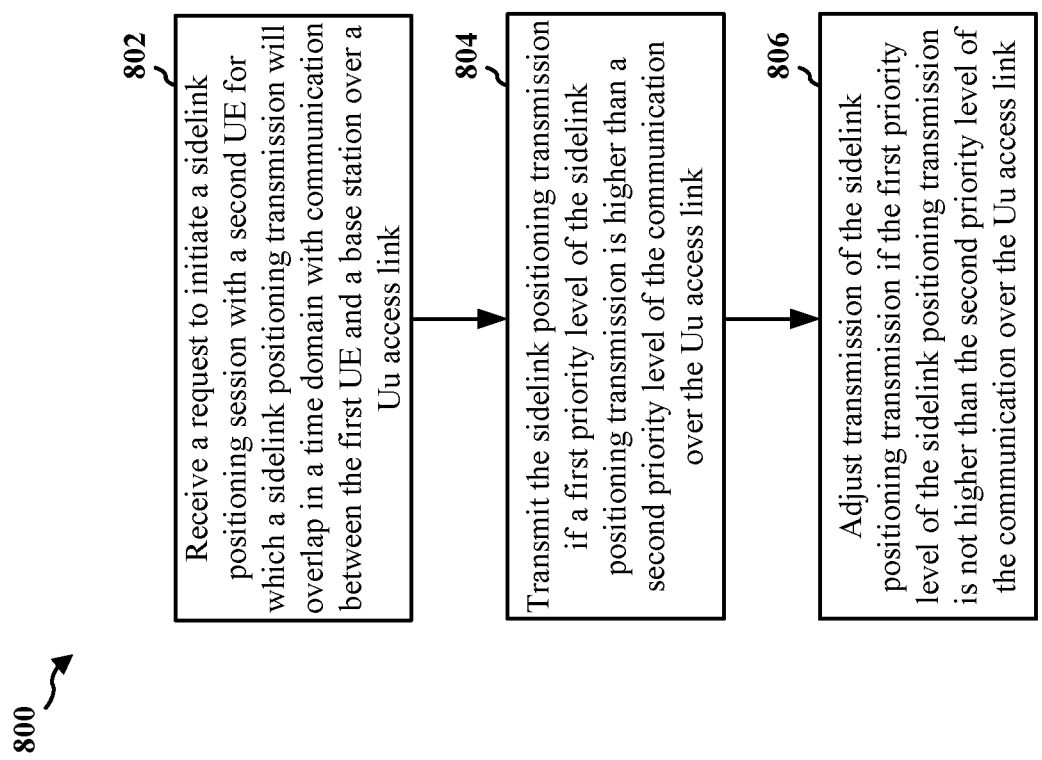
FIG. 8 is a flowchart of a method of wireless communication at a first UE.

FIG. 8 is a flowchart 800 of a method of wireless communication. The method may be performed by a first UE (e.g., the UE 104, 402, 502, 602; the apparatus 1202; etc.), which may include the memory 360 and which may be the entire UE 104, 402, 502, 602 or a component of the UE 104, 402, 502, 602, such as the TX processor 368, the RX processor 356, and/or the controller/processor 359. The method may be performed to resolve resource conflicts in time domain.

At 802, the first UE may receive a request to initiate a sidelink positioning session with a second UE for which a sidelink positioning transmission will overlap in a time domain with communication between the first UE and a base station over a Uu access link. For example, referring to FIG. 4, the first UE 402 may receive, at 408a, an initiation request for a sidelink positioning session from the second UE 404. The reception, at 802, may be performed by the reception component 1230 of the apparatus 1202 in FIG. 12.

At 804, the first UE may transmit the sidelink positioning transmission if a first priority level of the sidelink positioning transmission is higher than a second priority level of the communication over the Uu access link. For example, referring to FIG. 4, the first UE 402 may transmit, at 418, a sidelink positioning session to the second UE 404 if the sidelink positioning priority is determined, at 414, to be greater than the Uu access link priority. The transmission, at 804, may be performed by the transmission component 1234 of the apparatus 1202 in FIG. 12.

At 806, the first UE may adjust transmission of the sidelink positioning transmission if the first priority level of the sidelink positioning transmission is not higher than the second priority level of the communication over the Uu access link. For example, referring to FIG. 4, the first UE 402 may adjust, at 420, transmission of the sidelink positioning transmission if the sidelink positioning priority is determined, at 414, to not be greater than the Uu access link priority. For example, the first UE 402 may delay, drop, and/or reschedule the sidelink positioning transmission to adjust the transmission, at 420. The adjustment, at 806, may be performed by the adjustment component 1244 of the apparatus 1202 in FIG. 12.

Figure 9:
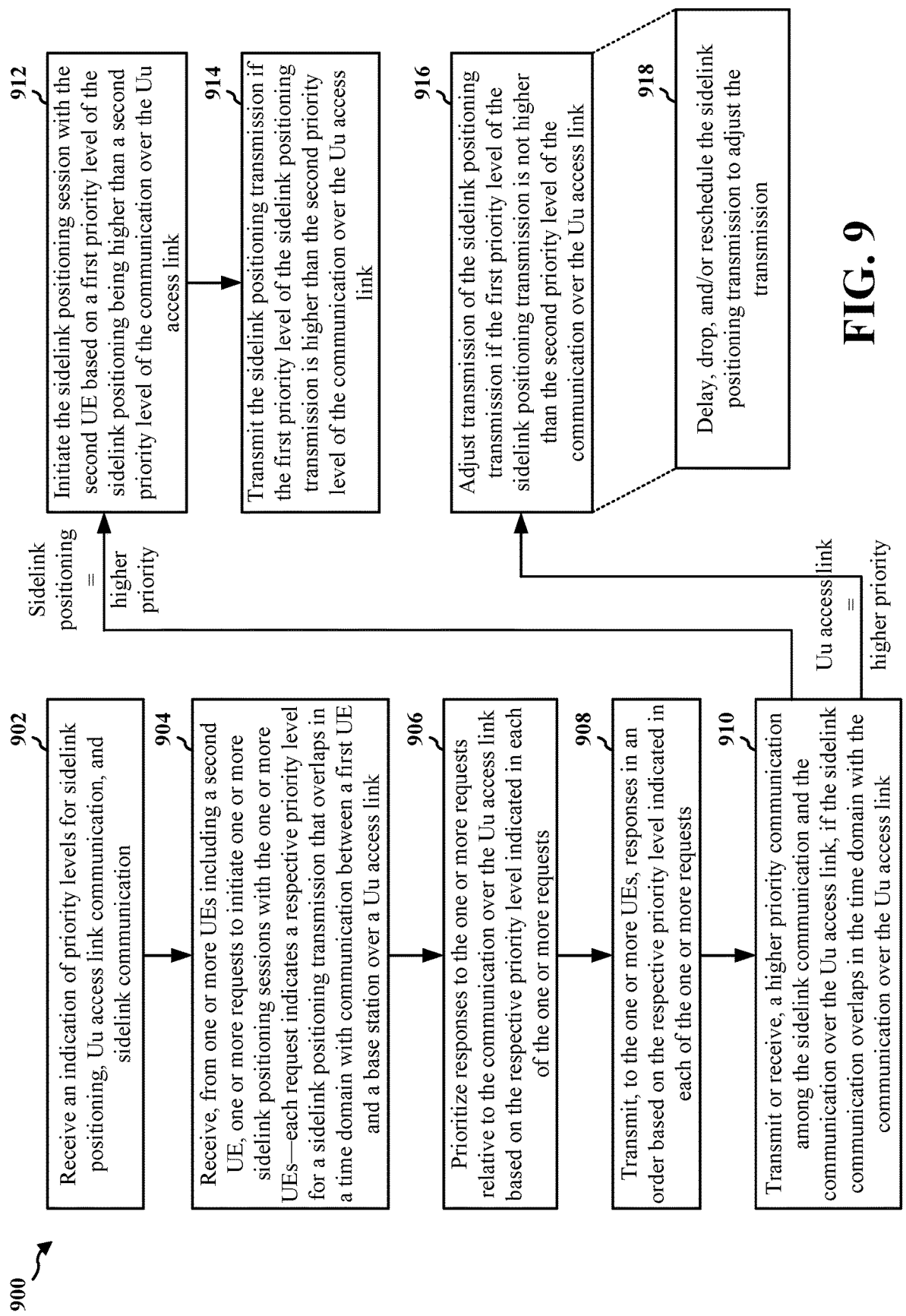
FIG. 9 is a flowchart of a method of wireless communication at a first UE.

FIG. 9 is a flowchart 900 of a method of wireless communication. The method may be performed by a first UE (e.g., the UE 104, 402, 502, 602; the apparatus 1202; etc.), which may include the memory 360 and which may be the entire UE 104, 402, 502, 602 or a component of the UE 104, 402, 502, 602, such as the TX processor 368, the RX processor 356, and/or the controller/processor 359. The method may be performed to resolve resource conflicts in time domain.

At 902, the first UE may receive an indication of priority levels for sidelink positioning, Uu access link communication, and sidelink communication. For example, referring to FIG. 4, the first UE 402 may receive, at 406, priority level indication(s) associated with sidelink positioning, Uu access link communications, sidelink data, etc., from the base station 403 and/or the second UE 404. In aspects, the first UE 402 may receive, at 406, a sidelink positioning priority via a SIB that the base station 403 transmits to perform a cell-wide configuration. The sidelink positioning priority, the Uu access link priority, and/or the sidelink data priority may also be received, at 406, via RRC signaling from the base station 403. The first priority level associated with the sidelink positioning communication and may be relative to Uu communication of a particular RAT. For example, the particular RAT may correspond to NR technologies. In further aspects, the first UE 402 may receive, at 406, the sidelink positioning priority from the second UE 404. The reception, at 902, may be performed by the reception component 1230 of the apparatus 1202 in FIG. 12.

At 904, the first UE may receive, from one or more UEs including a second UE, one or more requests to initiate one or more sidelink positioning sessions with the one or more UEs—each request indicates a respective priority level for a sidelink positioning transmission that overlaps in a time domain with communication between a first UE and a base station over a Uu access link. For example, referring to FIG. 4, the first UE 402 may receive, at 408a, an initiation request for a sidelink positioning session from the second UE 404. At 408b, the first UE 402 may also receive initiation request(s) for sidelink positioning sessions from one or more other UEs 405 that each indicate a respective priority level of transmissions associated with the one or more other UEs 405. The sidelink positioning transmissions associated with the initiation request(s) received, at 408a/408b, may overlap in a time domain with communication between the first UE 402 and the base station 403 over the Uu access link. The reception, at 904, may be performed by the reception component 1230 of the apparatus 1202 in FIG. 12.

At 906, the first UE may prioritize responses to the one or more requests relative to the communication over the Uu access link based on the respective priority level indicated in each of the one or more requests. For example, referring to FIG. 4, the first UE 402 may prioritize, at 410, responses to the initiation request(s) relative to other communications based on the priority levels indicated at 406-408b. The prioritizing, at 906, may be performed by the prioritization component 1240 of the apparatus 1202 in FIG. 12.

At 908, the first UE may transmit, to the one or more UEs, responses in an order based on the respective priority level indicated in each of the one or more requests. For example, referring to FIG. 4, the first UE 402 may transmit at 412a-412b response(s) to the initiation request(s) received, at 408a-408b, based on the respective priority levels indicated in the initiation request(s). The respective priority level of the responses may correspond to a same priority as a respective request for one of the multiple sidelink positioning sessions. The transmission, at 908, may be performed by the transmission component 1234 of the apparatus 1202 in FIG. 12.

At 910, the first UE may transmit or receive, a higher priority communication among the sidelink communication and the communication over the Uu access link, if the sidelink communication overlaps in the time domain with the communication over the Uu access link. For example, referring to FIG. 5, the first UE 502 may transmit, at 530, a post PRS message 532 to the second UE 504 and/or receive, at 534, a post PRS message 536 from the second UE 504. The transmission or reception, at 910, may be performed by the cellular RF transceiver 1222 of the apparatus 1202 in FIG. 12.

At 912, the first UE may initiate the sidelink positioning session with the second UE based on a first priority level of the sidelink positioning being higher than a second priority level of the communication over the Uu access link. For example, referring to FIG. 4, the first UE 402 may initiate, at 416, a sidelink positioning session with the second UE 404 if the sidelink positioning priority is determined, at 414, to have a greater priority than the Uu access link priority. The initiation, at 912, may be performed by the initiation component 1242 of the apparatus 1202 in FIG. 12.

At 914, the first UE may transmit the sidelink positioning transmission if the first priority level of the sidelink positioning transmission is higher than the second priority level of the communication over the Uu access link. For example, referring to FIG. 4, the first UE 402 may transmit, at 418, a sidelink positioning transmission to the second UE 404 if the sidelink positioning priority is determined, at 414, to have a greater priority than the Uu access link priority. The first priority level for the sidelink positioning session may be based on at least one of an application layer service, a transmitter type, or an assigned value of a positioning session initiator of the second UE 404. The first priority level may be based on a pre-configuration of the first UE 402 or may be a defined value. That is, the pre-configuration may be associated with a value stored at the first UE 402 for the first priority level. The transmission, at 914, may be performed by the transmission component 1234 of the apparatus 1202 in FIG. 12.

At 916, the first UE may adjust transmission of the sidelink positioning transmission if the first priority level of the sidelink positioning transmission is not higher than the second priority level of the communication over the Uu access link. For example, referring to FIG. 4, the first UE 402 may adjust, at 420, transmission of the sidelink positioning transmission to the second UE 404 if the sidelink positioning priority is determined, at 414, to not have a greater priority than the Uu access link priority. The adjustment, at 916, may be performed by the adjustment component 1244 of the apparatus 1202 in FIG. 12.

At 918, the first UE may delay, drop, and/or reschedule the sidelink positioning transmission to adjust the transmission. For example, referring to FIG. 4, the first UE 402 may delay/drop/reschedule the sidelink positioning transmission to adjust the transmission, at 420. The delay/drop/reschedule, at 918, may be performed by the adjustment component 1244 of the apparatus 1202 in FIG. 12.

Figure 10:
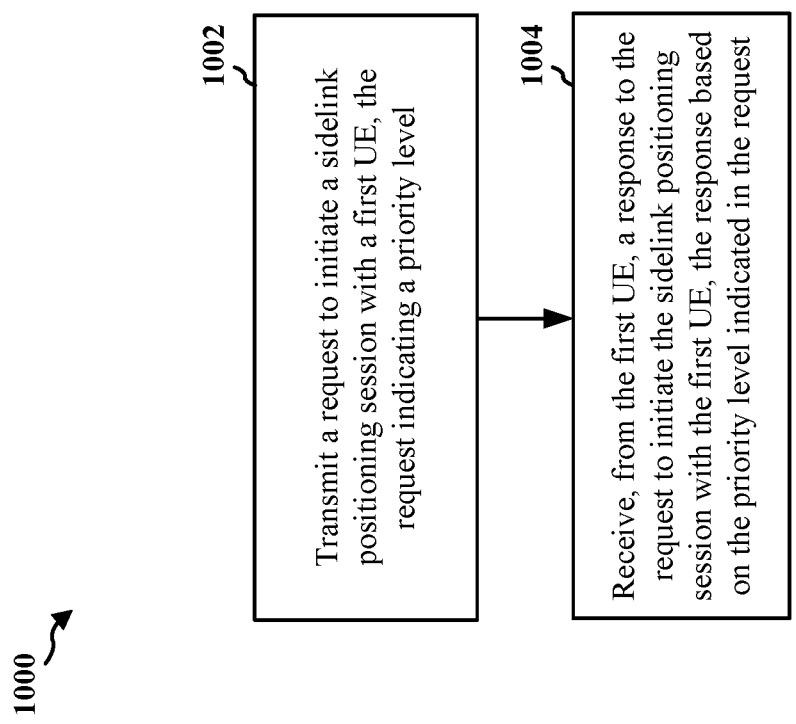
FIG. 10 is a flowchart of a method of wireless communication at a second UE.

FIG. 10 is a flowchart 1000 of a method of wireless communication. The method may be performed by a second UE (e.g., the UE 104, 404, 504, 604a-604b; the apparatus 1302; etc.), which may include the memory 376 and which may be the entire UE 104, 404, 504, 604a-604b or a component of the UE 104, 404, 504, 604a-604b, such as the TX processor 316, the RX processor 370, and/or the controller/processor 375. The method may be performed to resolve resource conflicts in time domain.

At 1002, the second UE may transmit a request to initiate a sidelink positioning session with a first UE, the request indicating a priority level. For example, referring to FIG. 4, the second UE 404 may transmit, at 408a, an initiation request for a sidelink positioning session with the first UE 402. The initiation request may include/indicate a priority level for sidelink positioning transmissions associated with the initiation request. The priority level may be relative to at least one of one or more requests of one or more other UEs 405 for sidelink positioning communication. The priority level may also be relative to other communication over a Uu access link. For example, the priority level may be relative to the other communication over the Uu access link of a particular RAT, where the particular RAT may correspond to NR technologies. The transmission, at 1002, may be performed by the sidelink positioning component 1340 of the apparatus 1302 in FIG. 13.

At 1004, the second UE may receive, from the first UE, a response to the request to initiate the sidelink positioning session with the first UE, the response based on the priority level indicated in the request. For example, referring to FIG. 4, the second UE 404 may receive, at 412a, a response from the first UE 402 to the initiation request indicative of the priority level transmitted, at 408a, to the first UE 402. A response priority of the response received, at 412a, may correspond to a same priority as the request transmitted, at 408a, to initiate the sidelink positioning session with the first UE 402. The transmission, at 1004, may be performed by the sidelink positioning component 1340 of the apparatus 1302 in FIG. 13.

Figure 11:
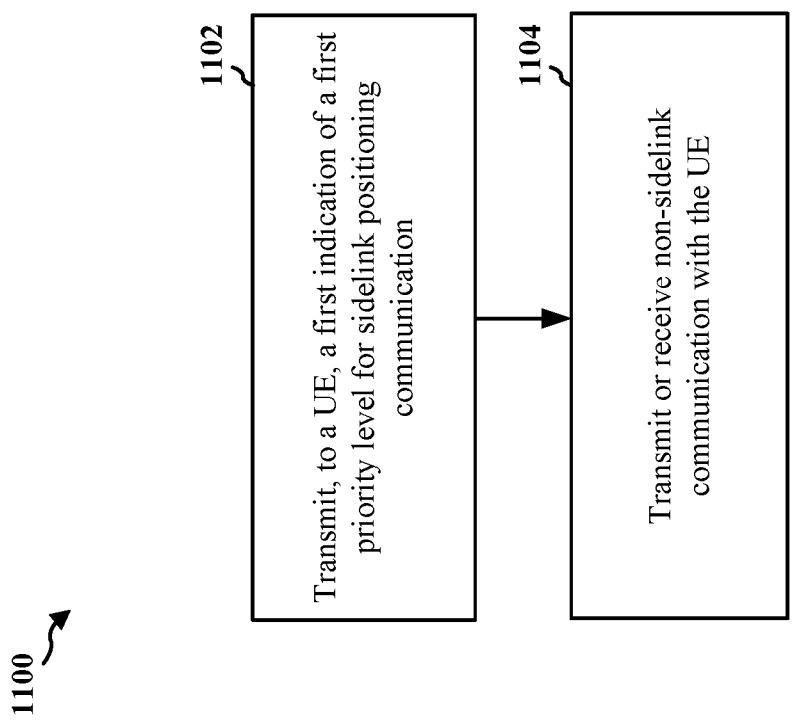
FIG. 11 is a flowchart of a method of wireless communication at a base station.

FIG. 11 is a flowchart 1100 of a method of wireless communication. The method may be performed by a base station (e.g., the base station 102/403; the apparatus 1402; etc.), which may include the memory 376 and which may be the entire base station 102/403 or a component of the base station 102/403, such as the TX processor 316, the RX processor 370, and/or the controller/processor 375.

At 1102, the base station may transmit, to a UE, a first indication of a first priority level for sidelink positioning communication. For example, referring to FIG. 4, the base station 403 may transmit, at 406 and 406b, a priority level indication to the first UE 402 and/or the second UE 404 for sidelink positioning. The transmission, at 1102, may be performed by the communication component 1440 of the apparatus 1402 in FIG. 14.

At 1104, the base station may transmit or receive non-sidelink communication with the UE. For example, referring to FIG. 4, the base station 403 may communicate, at 421, with the first UE 402 via a Uu communication link. The communication, at 1104, may be performed by the communication component 1440 of the apparatus 1402 in FIG. 14.

Figure 12:
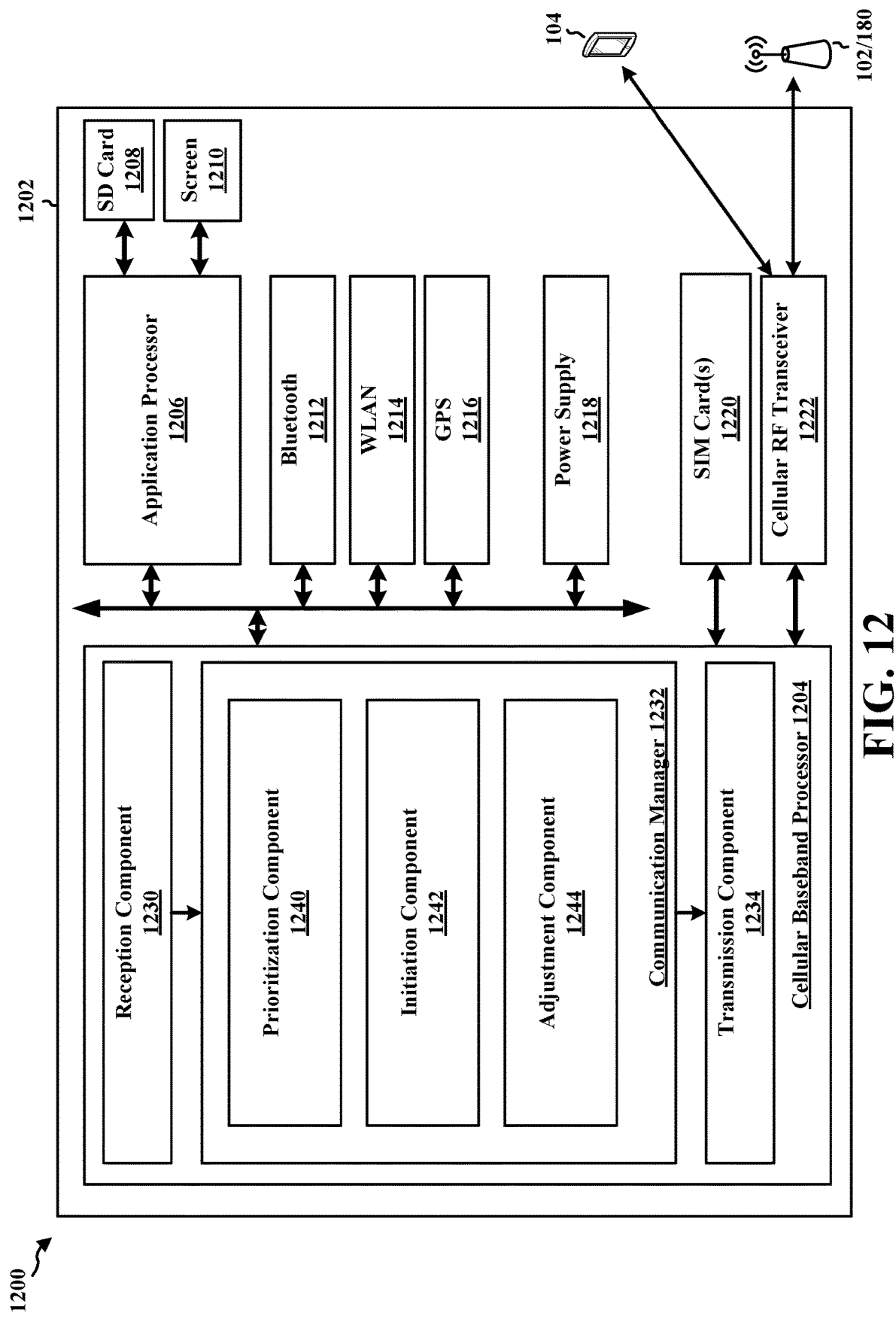
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the device 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The reception component 1230 is configured, e.g., as described in connection with 802, 902, and 904, to receive a request to initiate a sidelink positioning session with a second UE for which a sidelink positioning transmission will overlap in a time domain with communication between the first UE and a base station over a Uu access link; to receive an indication of priority levels for sidelink positioning, Uu access link communication, and sidelink communication; and to receive, from one or more UEs including a second UE, one or more requests to initiate one or more sidelink positioning sessions with the one or more UEs—each request indicates a respective priority level for a sidelink positioning transmission that overlaps in a time domain with communication between a first UE and a base station over a Uu access link. The transmission component 1234 is configured, e.g., as described in connection with 804, 908, and 914, to transmit, to the one or more UEs, responses in an order based on the respective priority level indicated in each of the one or more requests; to transmit the sidelink positioning transmission if the first priority level of the sidelink positioning transmission is higher than the second priority level of the communication over the Uu access link. The cellular RF transceiver is configured 1222, e.g., as described in connection with 910, to transmit or receive, a higher priority communication among the sidelink communication and the communication over the Uu access link, if the sidelink communication overlaps in the time domain with the communication over the Uu access link.

The communication manager 1232 includes a prioritization component 1240 that is configured, e.g., as described in connection with 906, to prioritize responses to the one or more requests relative to the communication over the Uu access link based on the respective priority level indicated in each of the one or more requests. The communication manager 1232 further includes an initiation component 1242 that is configured, e.g., as described in connection with 912, to initiate the sidelink positioning session with the second UE based on a first priority level of the sidelink positioning being higher than a second priority level of the communication over the Uu access link. The communication manager 1232 further includes an adjustment component 1244 that is configured, e.g., as described in connection with 806, 916, and 918, to adjust transmission of the sidelink positioning transmission if the first priority level of the sidelink positioning transmission is not higher than the second priority level of the communication over the Uu access link; and to delay, drop, and/or reschedule the sidelink positioning transmission to adjust the transmission.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving a request to initiate a sidelink positioning session with a second UE for which a sidelink positioning transmission will overlap in a time domain with communication between the first UE and a base station over a Uu access link; transmitting the sidelink positioning transmission if a first priority level of the sidelink positioning transmission is higher than a second priority level of the communication over the Uu access link; and adjusting transmission of the sidelink positioning transmission if the first priority level of the sidelink positioning transmission is not higher than the second priority level of the communication over the Uu access link. The means for adjusting are further configured to at least one of delay the sidelink positioning transmission, drop the sidelink positioning transmission, or reschedule the sidelink positioning transmission.

The apparatus 1202 further includes means for receiving, in RRC signaling, the first priority level associated with sidelink positioning communication. The apparatus 1202 further includes means for receiving, in the RRC signaling, a third priority level associated with sidelink communication; and means for transmitting or receiving, a higher priority communication among the sidelink communication having the third priority level and the communication over the Uu access link having the second priority level, if the sidelink communication overlaps in the time domain with the communication over the Uu access link. The apparatus 1202 further includes means for receiving an indication of the first priority level for the sidelink positioning session from the second UE that requests the sidelink positioning session. The apparatus 1202 further includes means for receiving, from multiple UEs including the second UE, multiple requests to initiate multiple sidelink positioning sessions with the multiple UEs, each request indicating a respective priority level; and means for prioritizing responses to the multiple requests relative to the communication over the Uu access link based on the respective priority level indicated in each of the multiple requests. The apparatus 1202 further includes means for transmitting, to the multiple UEs, the responses in an order based on the respective priority level indicated in each of the multiple requests. The apparatus 1202 further includes means for initiating the sidelink positioning session with the second UE based on the first priority level being higher than the second priority level. The apparatus 1202 further includes means for receiving an indication of the first priority level in a cell-wide configuration included in a SIB.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
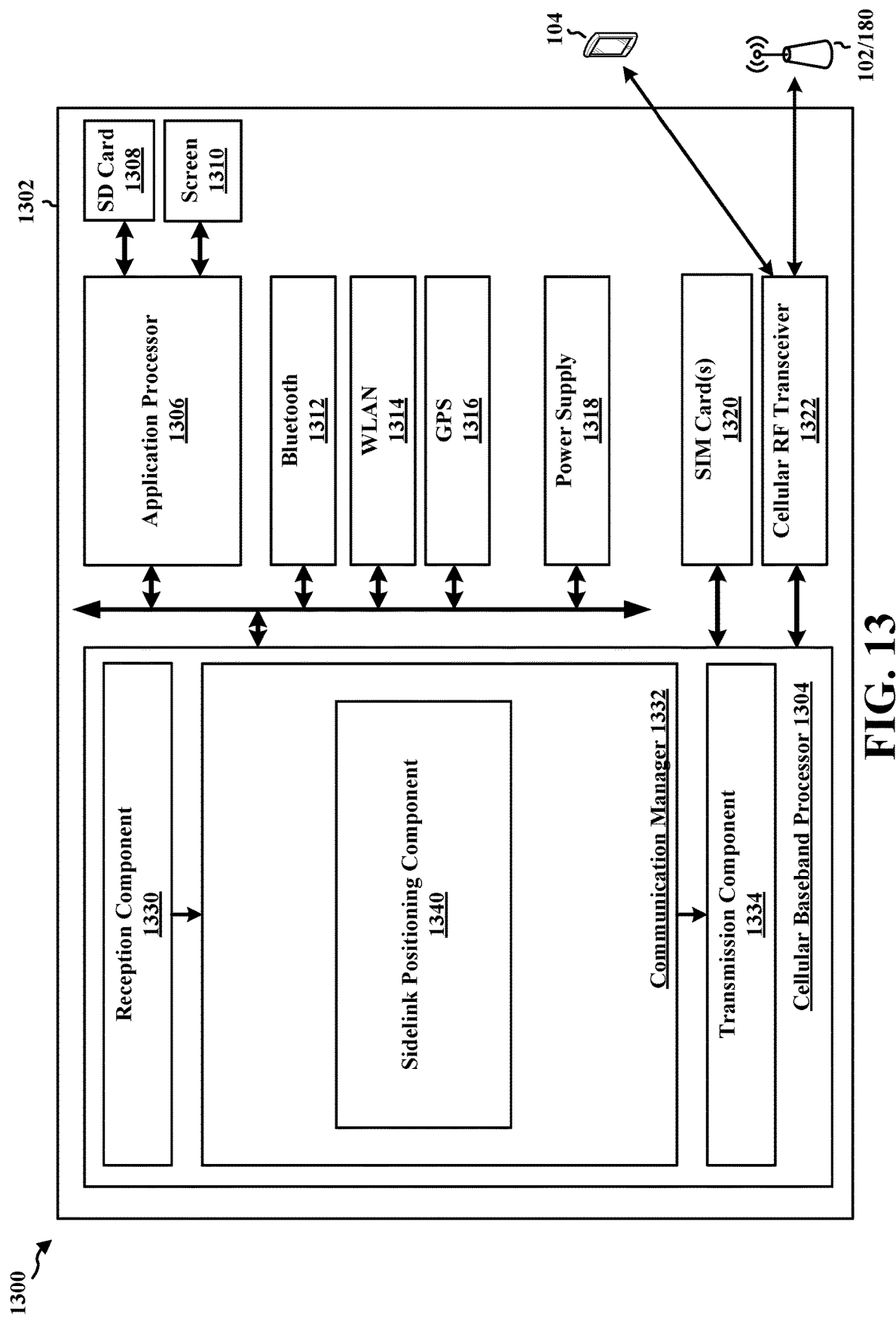
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a sidelink positioning component 1340 that is configured, e.g., as described in connection with 1002 and 1004, to transmit a request to initiate a sidelink positioning session with a first UE, the request indicating a priority level; and to receive, from the first UE, a response to the request to initiate the sidelink positioning session with the first UE, the response based on the priority level indicated in the request.

The apparatus may include additional components that perform each of the blocks of the algorithm in the flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for transmitting a request to initiate a sidelink positioning session with a first UE, the request indicating a priority level; and means for receiving, from the first UE, a response to the request to initiate the sidelink positioning session with the first UE, the response based on the priority level indicated in the request.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
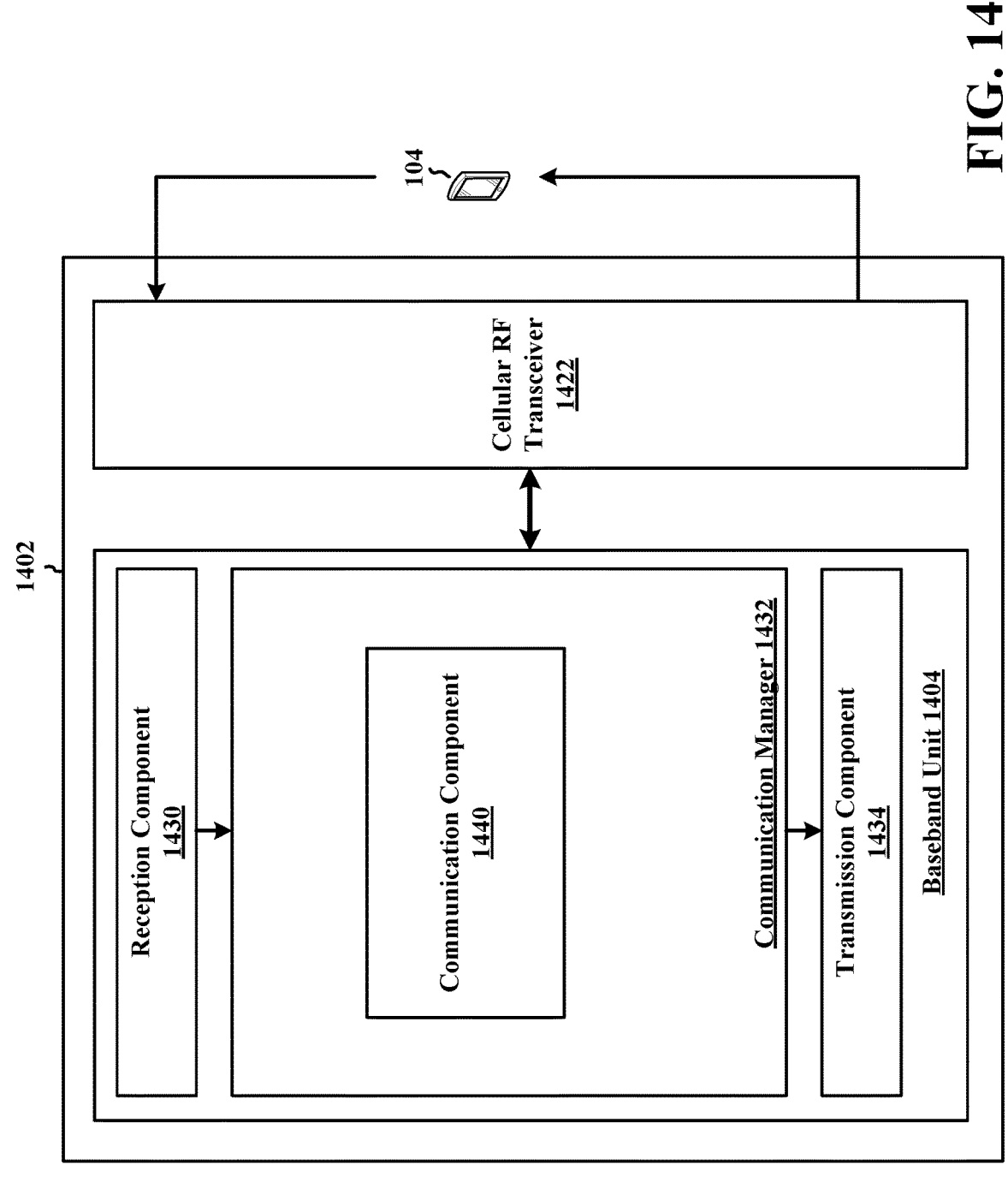
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a communication component 1440 that is configured, e.g., as described in connection with 1102 and 1104, to transmit, to a UE, a first indication of a first priority level for sidelink positioning communication; and transmit or receive non-sidelink communication with the UE. The transmitting or receiving may also be performed by the cellular RF transceiver 1422, the transmission component 1434, or the reception component 1430.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting, to a UE, a first indication of a first priority level for sidelink positioning communication; and means for transmitting or receiving non-sidelink communication with the UE.

The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to receive a request to initiate a sidelink positioning session with a second UE for which a sidelink positioning transmission will overlap in a time domain with communication between the first UE and a base station over a Uu access link; transmit the sidelink positioning transmission if a first priority level of the sidelink positioning transmission is higher than a second priority level of the communication over the Uu access link; and adjust transmission of the sidelink positioning transmission if the first priority level of the sidelink positioning transmission is not higher than the second priority level of the communication over the Uu access link.

Aspect 2 may be combined with aspect 1 and includes that to adjust the transmission the at least one processor is further configured to at least one of delay the sidelink positioning transmission, drop the sidelink positioning transmission, or reschedule the sidelink positioning transmission.

Aspect 3 may be combined with any of aspects 1-2 and includes that the at least one processor is further configured to receive, in RRC signaling, the first priority level associated with sidelink positioning communication.

Aspect 4 may be combined with any of aspects 1-3 and includes that the first priority level associated with the sidelink positioning communication is relative to Uu communication of a particular RAT.

Aspect 5 may be combined with any of aspects 1-4 and includes that the particular RAT is NR.

Aspect 6 may be combined with any of aspects 1-5 and includes that the at least one processor is further configured to: receive, in the RRC signaling, a third priority level associated with sidelink communication; and transmit or receiving, a higher priority communication among the sidelink communication having the third priority level and the communication over the Uu access link having the second priority level, if the sidelink communication overlaps in the time domain with the communication over the Uu access link.

Aspect 7 may be combined with any of aspects 1-6 and includes that the first priority level for the sidelink positioning session is based on at least one of an application layer service, a transmitter type, or an assigned value of a positioning session initiator of the second UE.

Aspect 8 may be combined with any of aspects 1-7 and includes that the at least one processor is further configured to receive an indication of the first priority level for the sidelink positioning session from the second UE that requests the sidelink positioning session.

Aspect 9 may be combined with any of aspects 1-8 and includes that the at least one processor is further configured to: receive, from multiple UEs including the second UE, multiple requests to initiate multiple sidelink positioning sessions with the multiple UEs, each request indicating a respective priority level; and prioritize responses to the multiple requests relative to the communication over the Uu access link based on the respective priority level indicated in each of the multiple requests.

Aspect 10 may be combined with any of aspects 1-9 and includes that the at least one processor is further configured to transmit, to the multiple UEs, the responses in an order based on the respective priority level indicated in each of the multiple requests.

Aspect 11 may be combined with any of aspects 1-10 and includes that the respective priority level of the responses corresponds to a same priority as a respective request for one of the multiple sidelink positioning sessions.

Aspect 12 may be combined with any of aspects 1-11 and includes that the at least one processor is further configured to initiate the sidelink positioning session with the second UE based on the first priority level being higher than the second priority level.

Aspect 13 may be combined with any of aspects 1-12 and includes that the first priority level is based on a pre-configuration of the first UE or is a defined value, the pre-configuration associated with a value stored at the first UE for the first priority level.

Aspect 14 may be combined with any of aspects 1-13 and includes that the at least one processor is further configured to receive an indication of the first priority level in a cell-wide configuration included in a SIB.

Aspect 15 may be combined with any of aspects 1-14 and further includes at least one of a transceiver or an antenna coupled to the at least one processor.

Aspect 16 is an apparatus for wireless communication at a second UE including at least one processor coupled to a memory and configured to transmit a request to initiate a sidelink positioning session with a first UE, the request indicating a priority level; and receive, from the first UE, a response to the request to initiate the sidelink positioning session with the first UE, the response based on the priority level indicated in the request.

Aspect 17 may be combined with aspect 16 and includes that a response priority of the response corresponds to a same priority as the request to initiate the sidelink positioning session with the first UE.

Aspect 18 may be combined with any of aspects 16-17 and includes that the priority level is relative to at least one of one or more requests of one or more different UEs for sidelink positioning communication.

Aspect 19 may be combined with any of aspects 16-18 and includes that the priority level is relative to other communication over a Uu access link.

Aspect 20 may be combined with any of aspects 16-19 and includes that the priority level is relative to the other communication over the Uu access link of a particular RAT.

Aspect 21 may be combined with any of aspects 16-20 and includes that the particular RAT is NR.

Aspect 22 may be combined with any of aspects 16-21 and further includes at least one of a transceiver or an antenna coupled to the at least one processor.

Aspect 23 is an apparatus for wireless communication at a base station including at least one processor coupled to a memory and configured to transmit, to a UE, a first indication of a first priority level for sidelink positioning communication; and transmit or receive non-sidelink communication with the UE.

Aspect 24 may be combined with aspect 23 and includes that the at least one processor is further configured to transmit, to the UE, a second indication of a second priority level for sidelink data.

Aspect 25 may be combined with any of aspects 23-24 and includes that the first indication is comprised in a SIB.

Aspect 26 may be combined with any of aspects 23-25 and includes that the first indication is comprised in RRC signaling.

Aspect 27 may be combined with any of aspects 23-26 and includes that the first priority level for the sidelink positioning communication is relative to Uu communication of a particular RAT.

Aspect 28 may be combined with any of aspects 23-27 and includes that the particular RAT is NR.

Aspect 29 may be combined with any of aspects 23-28 and further includes at least one of a transceiver or an antenna coupled to the at least one processor.

Aspect 30 is a method of wireless communication for implementing any of aspects 1-29.

Aspect 31 is an apparatus for wireless communication including means for implementing any of aspects 1-29.

Aspect 32 is a computer-readable medium storing computer executable code, the code when executed by at least one processor causes the at least one processor to implement any of aspects 1-29.

What is claimed is:

1. An apparatus for wireless communication at a first user equipment (UE), comprising:
   memory; and
   at least one processor coupled to the memory and configured to:
   receive, in radio resource control (RRC) signaling or a system information block (SIB) a first priority level associated with sidelink positioning communication;
   receive a request to initiate a sidelink positioning session with a second UE for which a sidelink positioning transmission will overlap in a time domain with communication between the first UE and a base station over a Uu access link;
   transmit the sidelink positioning transmission if the first priority level of the sidelink positioning transmission is higher than a second priority level of the communication over the Uu access link; and
   adjust transmission of the sidelink positioning transmission if the first priority level of the sidelink positioning transmission is not higher than the second priority level of the communication over the Uu access link.

2. The apparatus of claim 1, wherein to adjust the transmission the at least one processor is further configured to at least one of delay the sidelink positioning transmission, drop the sidelink positioning transmission, or reschedule the sidelink positioning transmission.

3. The apparatus of claim 1, wherein the first priority level associated with the sidelink positioning communication is in the RRC signaling.

4. The apparatus of claim 1, wherein the first priority level associated with the sidelink positioning communication is relative to Uu communication of a particular radio access technology (RAT).

5. The apparatus of claim 4, wherein the particular RAT is new radio (NR).

6. The apparatus of claim 1, wherein the at least one processor is further configured to:
   receive, in the RRC signaling, a third priority level associated with sidelink communication; and
   transmit or receiving, a higher priority communication among the sidelink communication having the third priority level and the communication over the Uu access link having the second priority level, if the sidelink communication overlaps in the time domain with the communication over the Uu access link.

7. The apparatus of claim 1, wherein the first priority level for the sidelink positioning session is based on at least one of an application layer service, a transmitter type, or an assigned value of a positioning session initiator of the second UE.

8. The apparatus of claim 1, wherein the at least one processor is further configured to receive an indication of the first priority level for the sidelink positioning session from the second UE that requests the sidelink positioning session.

9. The apparatus of claim 1, wherein the at least one processor is further configured to:
receive, from multiple UEs including the second UE, multiple requests to initiate multiple sidelink positioning sessions with the multiple UEs, each request indicating a respective priority level; and
prioritize responses to the multiple requests relative to the communication over the Uu access link based on the respective priority level indicated in each of the multiple requests.

10. The apparatus of claim 9, wherein the at least one processor is further configured to transmit, to the multiple UEs, the responses in an order based on the respective priority level indicated in each of the multiple requests.

11. The apparatus of claim 10, wherein the respective priority level of the responses corresponds to a same priority as a respective request for one of the multiple sidelink positioning sessions.

12. The apparatus of claim 1, wherein the at least one processor is further configured to initiate the sidelink positioning session with the second UE based on the first priority level being higher than the second priority level.

13. The apparatus of claim 1, wherein an indication of the first priority level is in a cell-wide configuration included in the SIB.

14. The apparatus of claim 1, further comprising at least one of a transceiver or an antenna coupled to the at least one processor.

15. An apparatus for wireless communication at a base station, comprising:
a memory; and
at least one processor coupled to the memory and configured to:
transmit, to a user equipment (UE), a first indication of a first priority level for sidelink positioning communication, wherein the first indication is comprised in one of radio resource control (RRC) signaling or a system information block (SIB); and
transmit or receive non-sidelink communication with the UE.

16. The apparatus of claim 15, wherein the at least one processor is further configured to transmit, to the UE, a second indication of a second priority level for sidelink data.

17. The apparatus of claim 15, wherein the first indication is comprised in the SIB.

18. The apparatus of claim 15, wherein the first indication is comprised in the RRC signaling.

19. The apparatus of claim 15, wherein the first priority level for the sidelink positioning communication is relative to Uu communication of a particular radio access technology (RAT).

20. The apparatus of claim 19, wherein the particular RAT is new radio (NR).

21. The apparatus of claim 15, further comprising at least one of a transceiver or an antenna coupled to the at least one processor.

22. A method of wireless communication at a first user equipment (UE), comprising:
receiving, in radio resource control (RRC) signaling or a system information block (SIB) a first priority level associated with sidelink positioning communication;
receiving a request to initiate a sidelink positioning session with a second UE for which a sidelink positioning transmission will overlap in a time domain with communication between the first UE and a base station over a Uu access link;
transmitting the sidelink positioning transmission if the first priority level of the sidelink positioning transmission is higher than a second priority level of the communication over the Uu access link; and
adjusting transmission of the sidelink positioning transmission if the first priority level of the sidelink positioning transmission is not higher than the second priority level of the communication over the Uu access link.

23. The method of claim 22, wherein the first priority level associated with the sidelink positioning communication is comprised in the SIB.

24. The method of claim 22, wherein the first priority level associated with the sidelink positioning communication is comprised in the RRC signaling.

25. The method of claim 22, wherein adjusting the transmission includes at least one of delaying the sidelink positioning transmission, dropping the sidelink positioning transmission, or rescheduling the sidelink positioning transmission.

26. The method of claim 22, wherein the first priority level associated with the sidelink positioning communication is relative to Uu communication of a particular radio access technology (RAT).

27. The method of claim 26, wherein the particular RAT is new radio (NR).

28. A method of wireless communication at a base station, comprising:
transmitting, to a user equipment (UE), a first indication of a first priority level for sidelink positioning communication, wherein the first indication is comprised in one of radio resource control (RRC) signaling or a system information block (SIB); and
transmitting or receiving non-sidelink communication with the UE.

29. The method of claim 28, further comprising:
transmitting, to the UE, a second indication of a second priority level for sidelink data.

30. The method of claim 28, wherein the first indication is comprised in the SIB.

31. The method of claim 28, wherein the first indication is comprised in the RRC signaling.

* * * * *